(12) United States Patent
Tsubata

(10) Patent No.: US 8,654,268 B2
(45) Date of Patent: Feb. 18, 2014

(54) ACTIVE MATRIX SUBSTRATE WITH THIN INSULATING LAYER NOT OVERLAPPING CAPACITANCE ELECTRODE, LIQUID CRYSTAL PANEL, LIQUID CRYSTAL DISPLAY DEVICE, LIQUID CRYSTAL DISPLAY UNIT, AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 345 days.

(21) Appl. No.: 13/060,366

(22) PCT Filed: Jul. 9, 2009

(86) PCT No.: PCT/JP2009/062545
§ 371 (c)(1),
(2), (4) Date: Feb. 23, 2011

(87) PCT Pub. No.: WO2010/024050
PCT Pub. Date: Mar. 4, 2010

(65) Prior Publication Data
US 2011/0149179 A1 Jun. 23, 2011

(30) Foreign Application Priority Data
Aug. 27, 2008 (JP) .................................. 2008-218833

(51) Int. Cl.
*G02F 1/1343* (2006.01)
(52) U.S. Cl.
USPC ................ 349/39; 349/38; 349/143; 349/144
(58) Field of Classification Search
USPC .................. 349/54, 55, 192, 38, 39, 143, 144
See application file for complete search history.

(56) References Cited

U.S. PATENT DOCUMENTS

| 6,175,393 | B1 * | 1/2001 | Ban et al. .................... 349/39 |
| 6,515,720 | B1 * | 2/2003 | Iizuka et al. ................. 349/39 |
| 2002/0109813 | A1 | 8/2002 | Yu et al. |
| 2002/0113913 | A1 * | 8/2002 | Okada et al. ................. 349/39 |

(Continued)

FOREIGN PATENT DOCUMENTS

| CN | 1727971 A | 2/2006 |
| EP | 2 259 134 A1 | 12/2010 |

(Continued)

OTHER PUBLICATIONS

Japanese Office Action and translation thereof mailed May 22, 2012 in Japanese application 2010-526621.

(Continued)

*Primary Examiner* — Hoan C Nguyen
(74) *Attorney, Agent, or Firm* — Nixon & Vanderhye P.C.

(57) ABSTRACT

An active matrix substrate includes first and second pixel electrodes (17*a*, 17*b*) in each pixel region, the first pixel electrode (17*a*) is connected with a data signal line (15) via a transistor (12), a second pixel electrode (17*b*) is connected with the first pixel electrode (17*a*) via a capacitor formed between the second pixel electrode (17*b*) and a coupling capacitance electrode (67) electrically connected with the first pixel electrode (17*a*), the second pixel electrode (17*b*) overlaps a retention capacitor line (18) via an insulating layer, and the insulating layer has a thin region (51*a*) positioned to be at least a part of a portion which does not overlap the coupling capacitance electrode (67).

3 Claims, 26 Drawing Sheets

(56) References Cited

U.S. PATENT DOCUMENTS

| | | |
|---|---|---|
| 2006/0023137 A1 | 2/2006 | Kamada et al. |
| 2006/0187368 A1 | 8/2006 | Kim |
| 2007/0035685 A1* | 2/2007 | Yoshida et al. ............... 349/139 |
| 2008/0002076 A1 | 1/2008 | Yagi |
| 2008/0088788 A1 | 4/2008 | Cho |
| 2009/0065778 A1 | 3/2009 | Tsubata |
| 2009/0225247 A1 | 9/2009 | Yagi |
| 2009/0268116 A1 | 10/2009 | Yagi |
| 2011/0211130 A1* | 9/2011 | Tsubata ........................ 348/731 |

FOREIGN PATENT DOCUMENTS

| | | |
|---|---|---|
| JP | 4-348323 A | 12/1992 |
| JP | 06-067210 | 3/1994 |
| JP | 09-236825 | 9/1997 |
| JP | 2002-258307 A | 9/2002 |
| JP | 2006-39290 | 2/2006 |
| JP | 2006-259719 | 9/2006 |
| JP | 2008-97009 | 4/2008 |
| WO | 2006/064832 | 6/2006 |
| WO | 2007/108181 | 9/2007 |

OTHER PUBLICATIONS

International Search Report for PCT/JP2009/062545, mailed Aug. 4, 2009.

* cited by examiner

F I G. 5
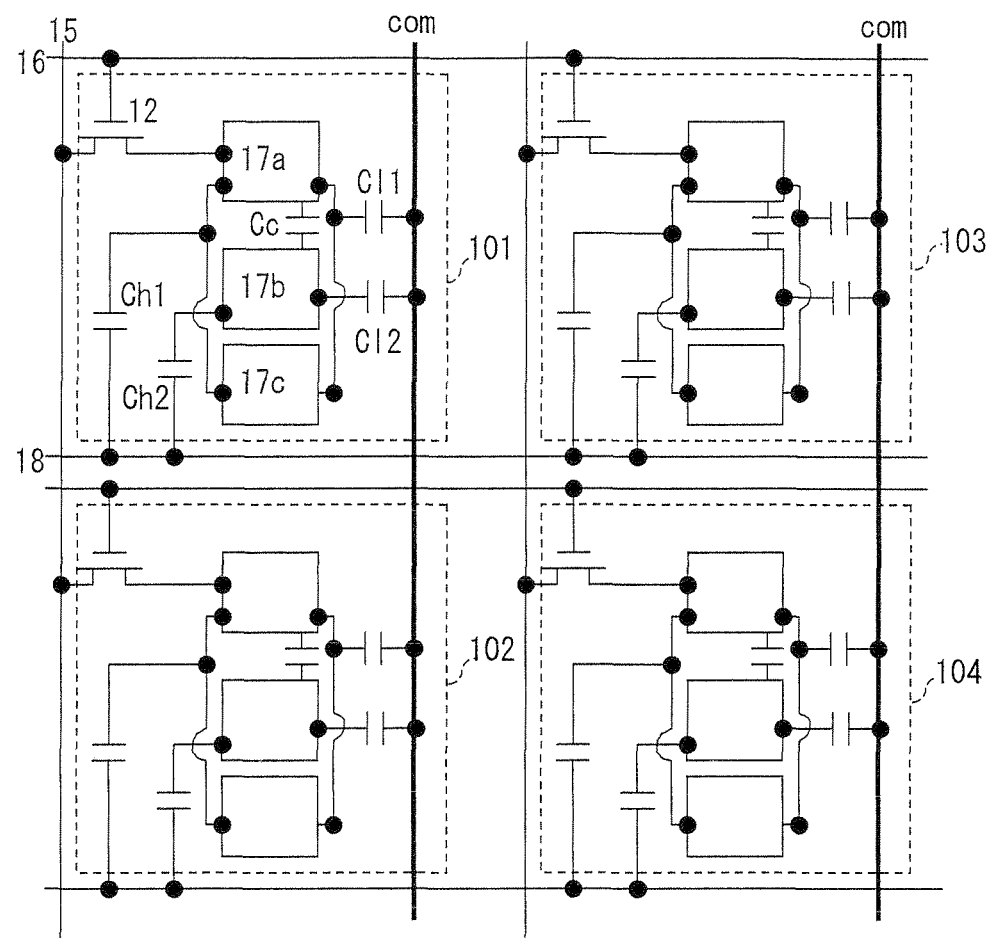

F I G. 1 0
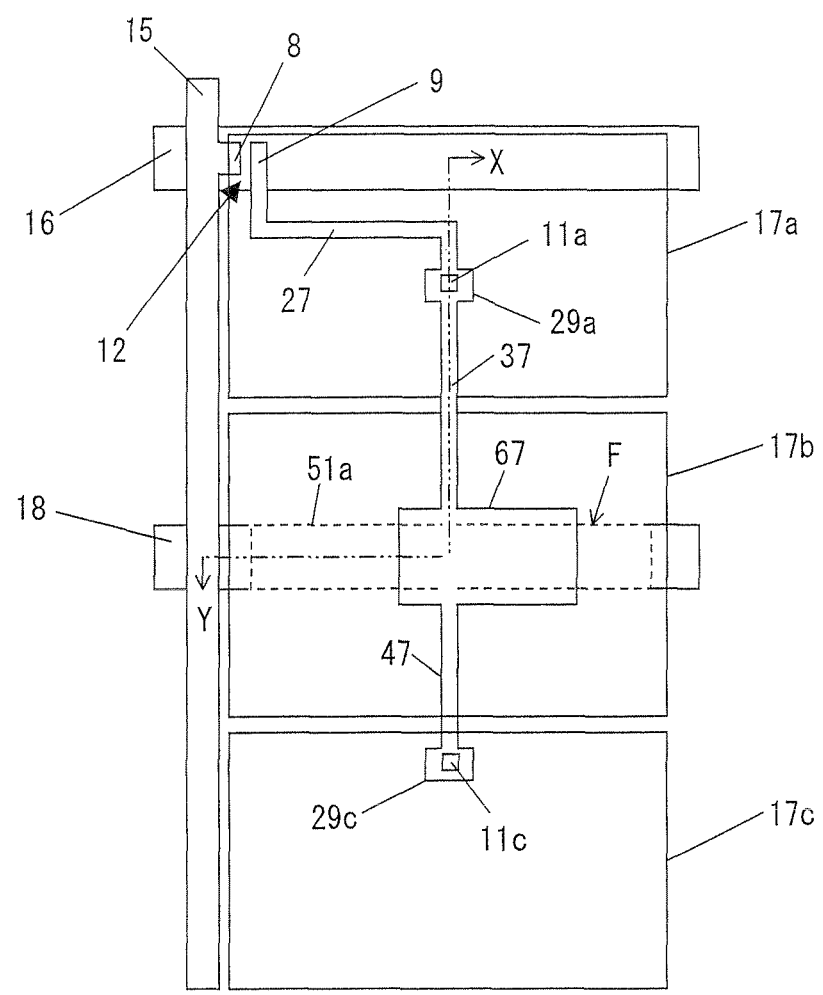

F I G. 1 1
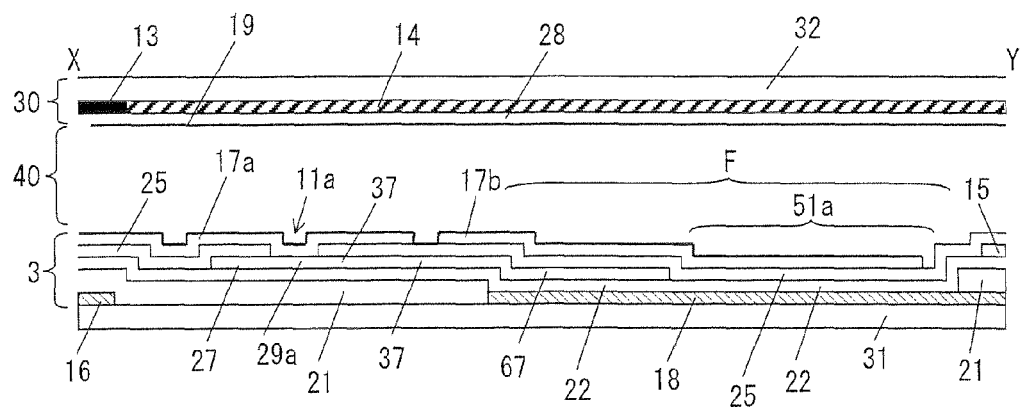

F I G. 1 2
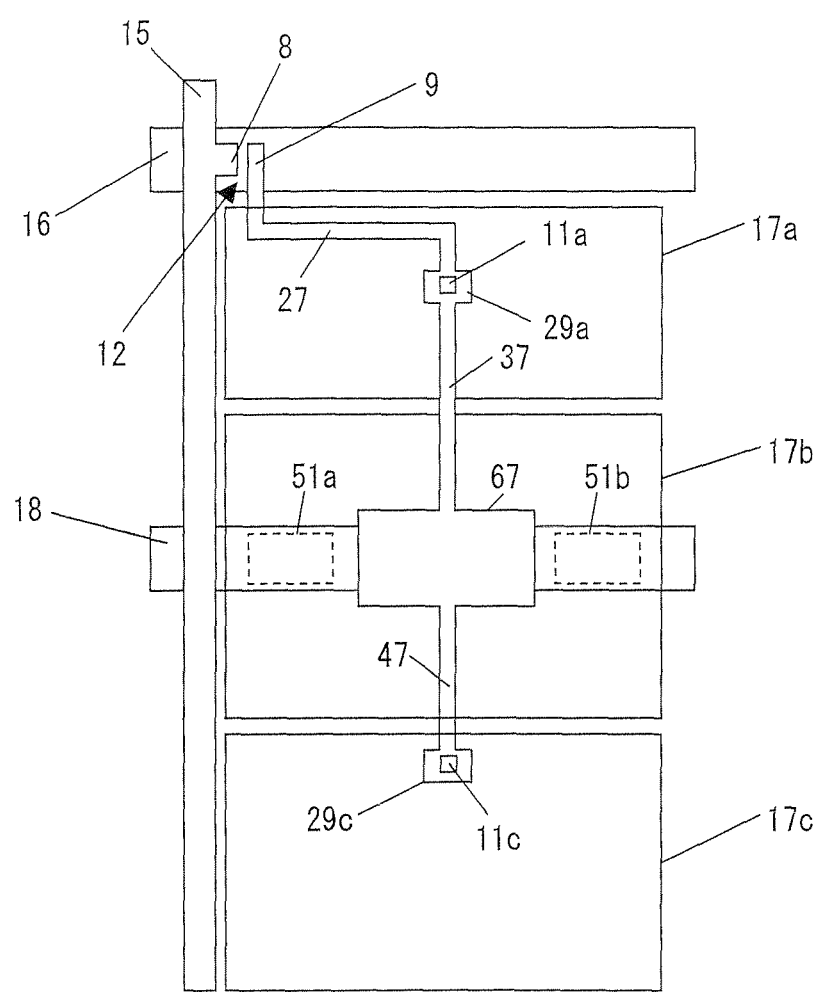

F I G. 1 4
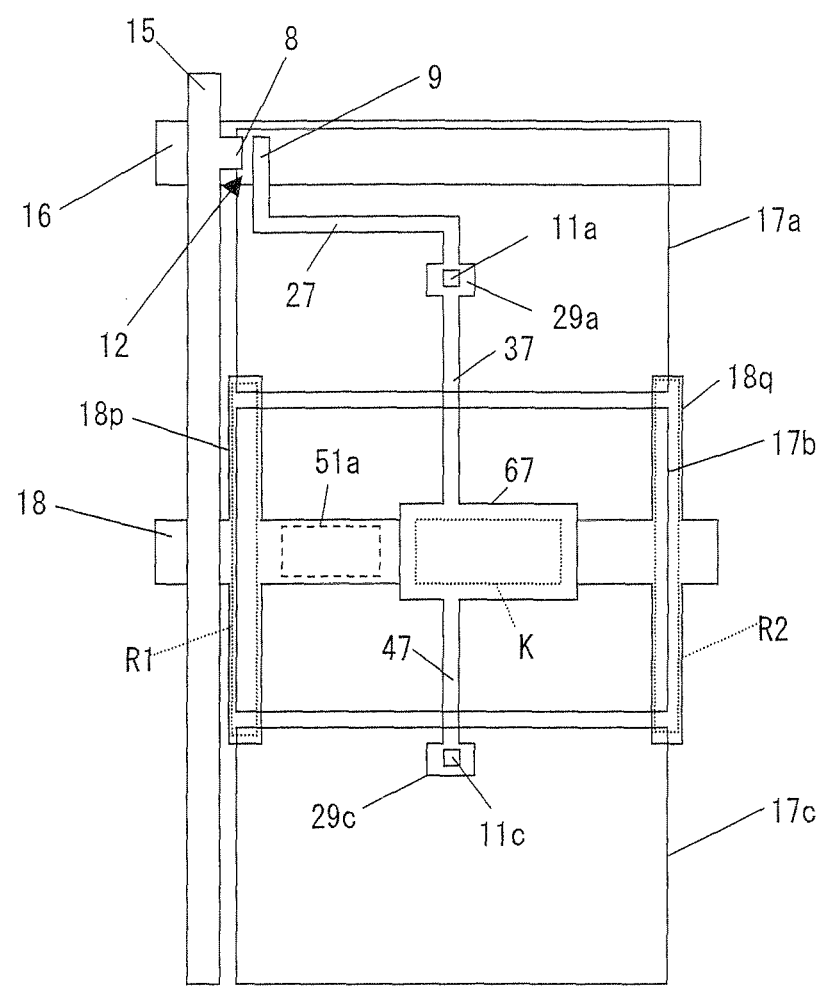

F I G. 1 5
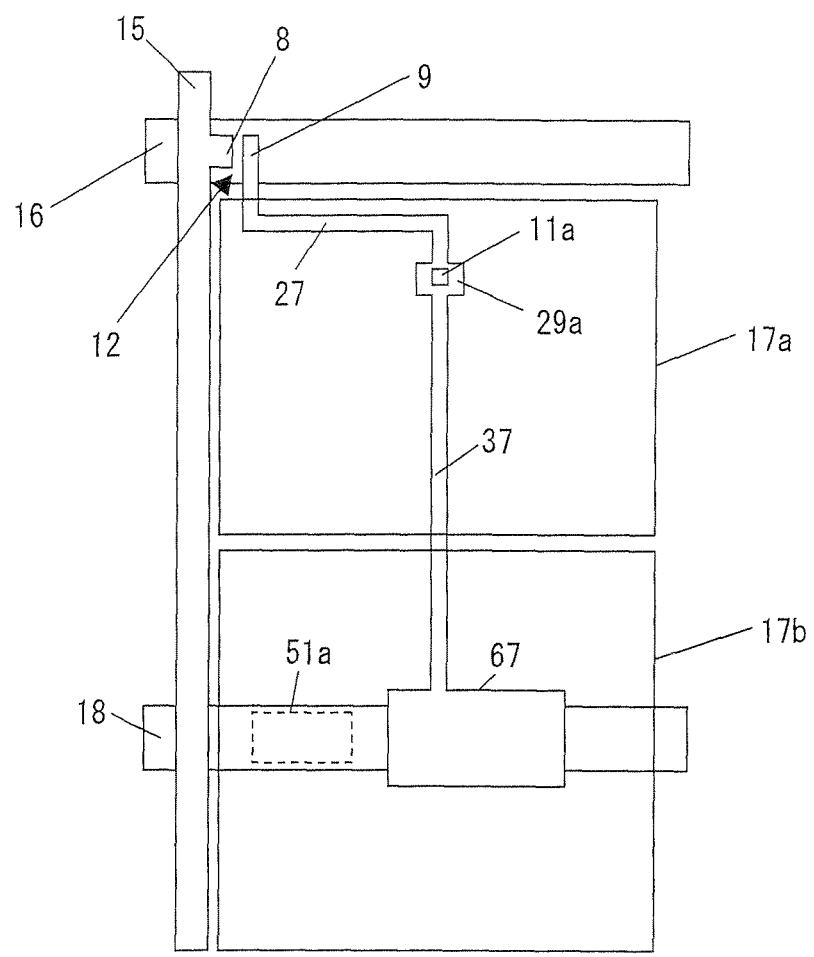

F I G. 1 6
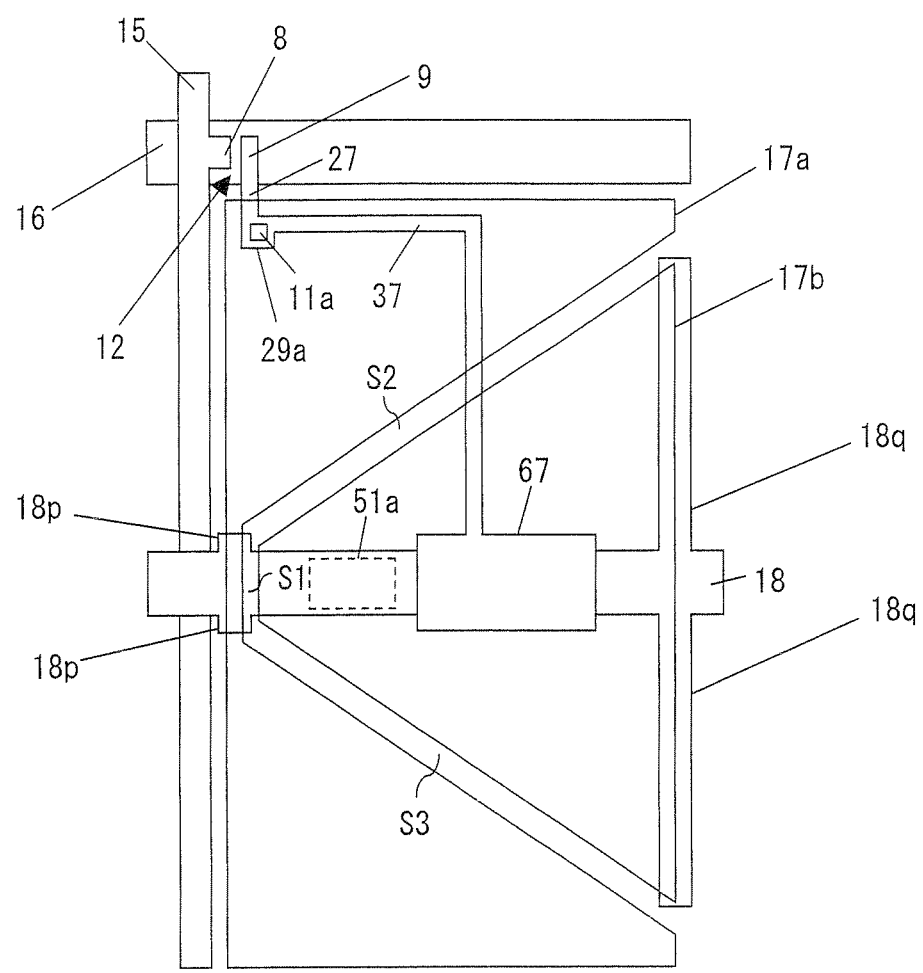

F I G. 1 7
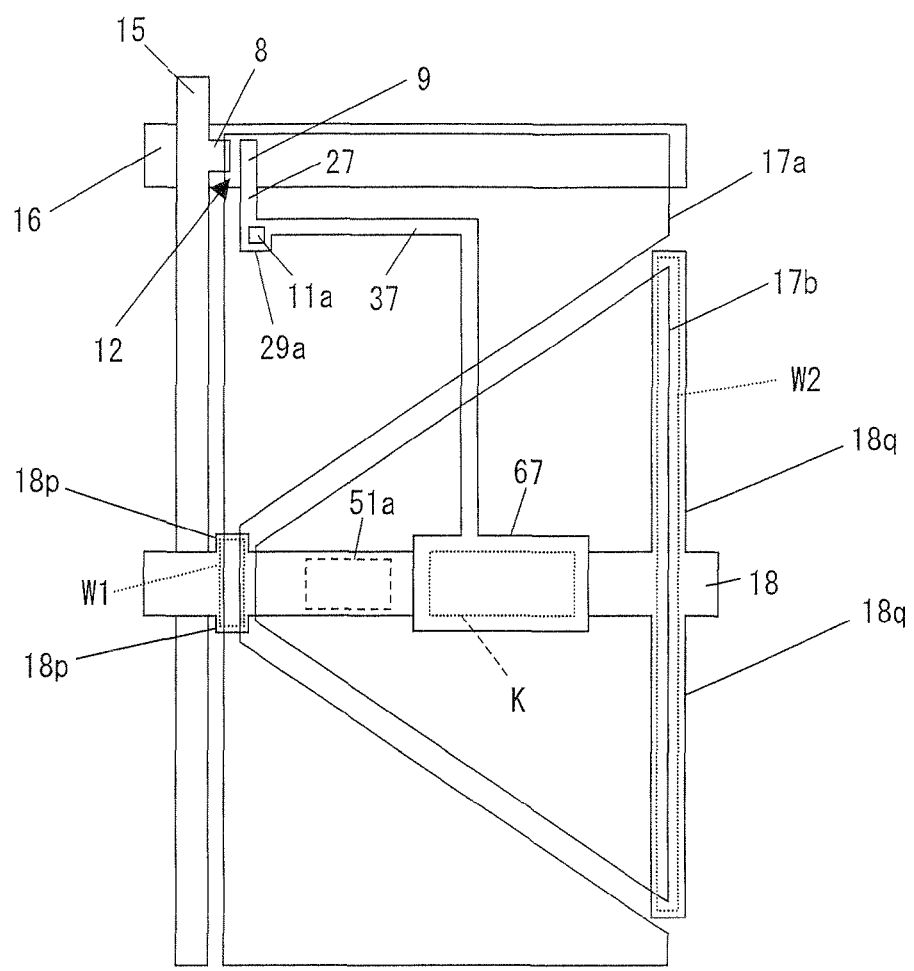

F I G. 1 8
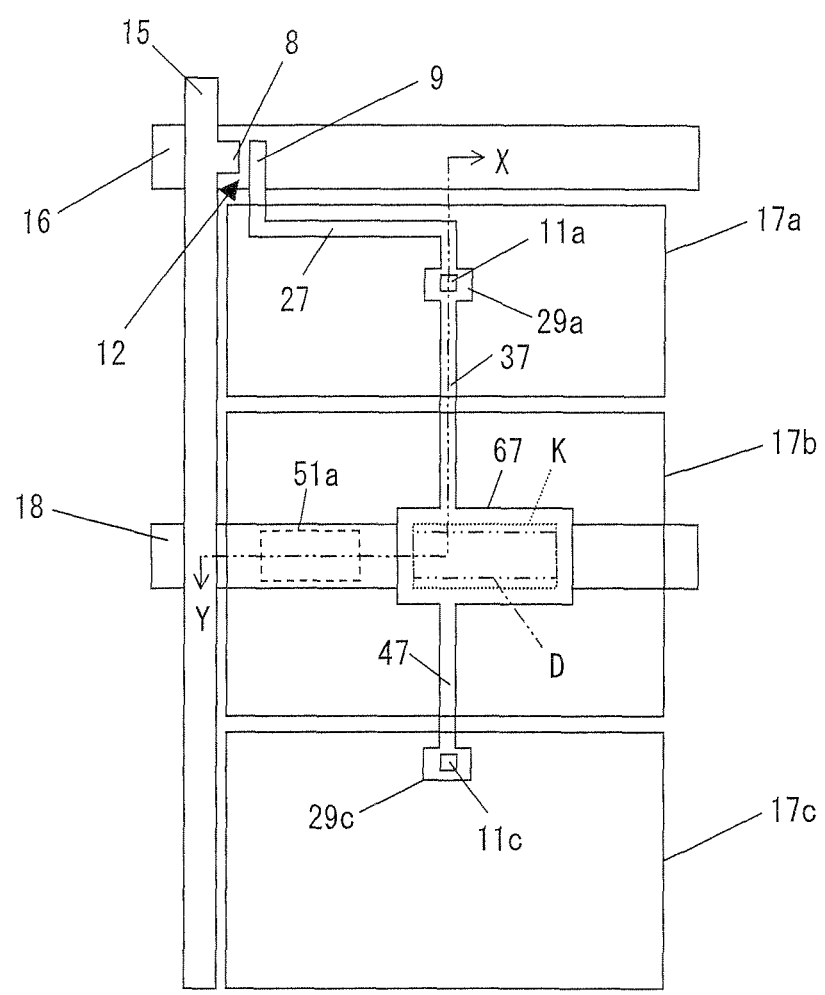

F I G. 2 3
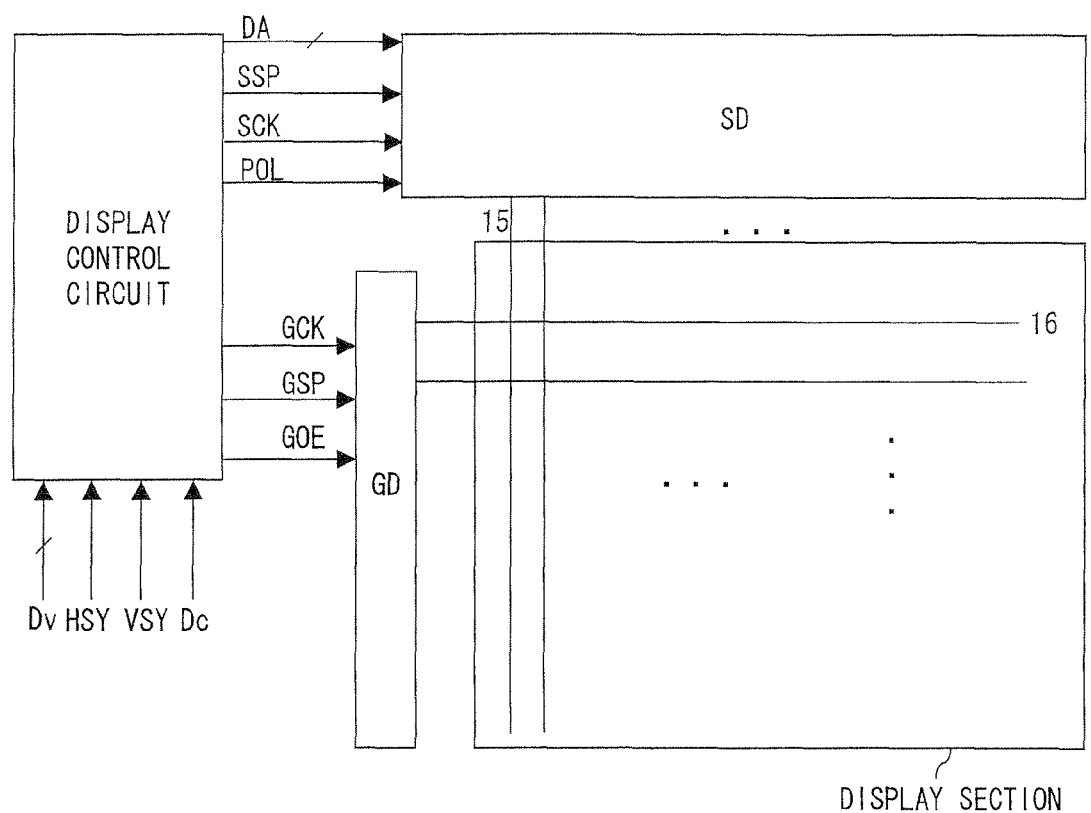

ACTIVE MATRIX SUBSTRATE WITH THIN INSULATING LAYER NOT OVERLAPPING CAPACITANCE ELECTRODE, LIQUID CRYSTAL PANEL, LIQUID CRYSTAL DISPLAY DEVICE, LIQUID CRYSTAL DISPLAY UNIT, AND TELEVISION RECEIVER

This application is the U.S. national phase of International Application No. PCT/JP2009/062545, filed 9 Jul. 2009, which designated the U.S. and claims priority to Japanese Patent Application No. 2008-218833, filed 27 Aug. 2008, the entire contents of each of which are hereby incorporated by reference.

TECHNICAL FIELD

The present invention relates to: an active matrix substrate in which a plurality of pixel electrodes are provided in one pixel region; and a liquid crystal display device (based on a pixel division system) including the active matrix substrate.

BACKGROUND ART

In order to improve a viewing angle dependency of a γ characteristic of a liquid crystal display device (e.g. to prevent excess brightness on a screen), there has been proposed a liquid crystal display device (based on a pixel division system. See Patent Literature 1 for example) in which a plurality of sub-pixels in one pixel are controlled to have different luminance so that area coverage modulation of the sub-pixels allows displaying a half tone.

In the active matrix substrate described in Patent Literature 1 (see FIG. 27), three pixel electrodes 121a-121c are provided in one pixel region in such a manner as to be along a source bus line 115, a source electrode 116s of a transistor 116 is connected with a contact electrode 117a, the contact electrode 117a and a control electrode 511 are connected with each other via an extraction line, the control electrode 511 and a contact electrode 117b are connected with each other via an extraction line, the contact electrode 117a and a pixel electrode 121a are connected with each other via a contact hole 120a, the contact electrode 117b and a pixel electrode 121c are connected with each other via a contact hole 120b, the pixel electrode 121b which is electrically floating overlaps the control electrode 511 via an insulating layer, and the pixel electrode 121b is capacitance-coupled to each of the pixel electrodes 121a and 121c (capacitance-coupling pixel division system). Further, an auxiliary capacitance electrode 512 is provided so as to be adjacent to the control electrode 511 in a row direction (direction in which a gate bus line 112 extends). The auxiliary capacitance electrode 512 is connected with the pixel electrode 121b via a contact hole 513. At a portion where the control electrode 511 and the auxiliary capacitor bus line 113 overlap each other, a retention capacitor between the pixel electrodes 121a and 121c and the auxiliary capacitor bus line 113 is formed. At a portion where the control electrode 512 and the auxiliary capacitor bus line 113 overlap each other, a retention capacitor between the pixel electrode 121b and the auxiliary capacitor bus line 113 is formed.

In a liquid crystal display device including the active matrix substrate, each of sub-pixels corresponding to the pixel electrodes 121a and 121c can serve as a bright sub-pixel and a sub-pixel corresponding to the pixel electrode 121b can serve as a dark sub-pixel. Area coverage modulation of the two bright sub-pixels and the one dark sub-pixel allows displaying a half tone.

CITATION LIST

Patent Literature

[Patent Literature 1] Japanese Patent Application Publication, Tokukai, No. 2006-39290 (published on Feb. 9, 2006)

SUMMARY OF INVENTION

Technical Problem

However, in the aforementioned conventional active matrix substrate, the control electrode 511 and the auxiliary capacitance electrode 512 are closely aligned in a pixel region in a row direction, which may cause a short-circuit between the control electrode 511 and the auxiliary capacitance electrode 512, resulting in a low process yield of active matrix substrates.

In view of the above, the present invention proposes an active matrix substrate based on a capacitance-coupling pixel division system, which can be produced with a higher process yield.

Solution to Problem

An active matrix substrate of the present invention includes a data signal line, a scanning signal line, a transistor connected with the data signal line and the scanning signal line, and a retention capacitor line, the active matrix substrate further includes a first pixel electrode and a second pixel electrode in each pixel region, the first pixel electrode being connected with the data signal line via the transistor, the second pixel electrode being connected with the first pixel electrode via a capacitor formed between the second pixel electrode and a coupling capacitance electrode electrically connected with the first pixel electrode, and the second pixel electrode overlapping the retention capacitor line via an insulating layer, and the insulating layer having a thin region positioned to be at least a part of a portion which does not overlap the coupling capacitance electrode.

In the active matrix substrate of the present invention, the insulating film between the second pixel electrode and the retention capacitor line has a thin region at a portion which does not overlap the coupling capacitance electrode. This configuration allows forming a retention capacitor without providing an electrode (auxiliary capacitance electrode) for forming a retention capacitor. Accordingly, it is possible to avoid a short-circuit between a control electrode (coupling capacitance electrode) and an auxiliary capacitance electrode as seen in a conventional configuration (see FIG. 27), without reduction in a retention capacitance between the second pixel electrode and the retention capacitor line. This allows improving a production yield of the active matrix substrate.

The active matrix substrate of the present invention may be arranged such that the insulating film includes a first region, a second region, and a third region, each of the first region, the second region, and the third region overlaps the retention capacitor line and the second pixel electrode, the first region and the third region have the thin region, and the second region has a portion overlapping the coupling capacitance electrode and the second pixel electrode, and the first region, the second region, and the third region are aligned in this order along a direction in which the scanning signal line extends.

The active matrix substrate of the present invention may be arranged such that an extracted line extracted from a conductive electrode of the transistor and the coupling capacitance electrode are connected with each other on a plane where the extracted line and the coupling capacitance electrode are positioned, and the extracted line is connected with the first pixel electrode via a contact hole.

The active matrix substrate of the present invention may be arranged such that the insulating film is at least one of an interlayer insulating film covering a channel of the transistor and a gate insulating film.

The active matrix substrate of the present invention may be arranged such that the insulating film is the interlayer insulating film, the interlayer insulating film includes an inorganic insulating film and an organic insulating film, and the thin region on the insulating film has been made by thinning the organic insulating film or removing the organic insulating film.

The active matrix substrate of the present invention may be arranged such that the insulating film is the interlayer insulating film, and the interlayer insulating film is designed such that at least a part of a portion overlapping the second pixel electrode and the coupling capacitance electrode is thin.

The active matrix substrate of the present invention may be arranged such that the interlayer insulating film includes an inorganic insulating film and an organic insulating film, and at least a part of the portion overlapping the second pixel electrode and the coupling capacitance electrode is designed such that the organic insulating film is thinned or the organic insulating film is removed.

The active matrix substrate of the present invention may be arranged such that the insulating film is the gate insulating film, the gate insulating film includes an inorganic insulating film and an organic insulating film, and the thin region on the insulating film has been made by thinning the organic insulating film or removing the organic insulating film.

The active matrix substrate of the present invention may be arranged such that the insulating film is the gate insulating film, and the gate insulating film is designed such that at least a part of a portion overlapping the second pixel electrode and the coupling capacitance electrode is thin.

The active matrix substrate of the present invention may be arranged such that the gate insulating film includes an inorganic insulating film and an organic insulating film, and at least a part of the portion overlapping the second pixel electrode and the coupling capacitance electrode is designed such that the organic insulating film is thinned or the organic insulating film is removed.

The active matrix substrate of the present invention may be arranged such that the organic insulating film includes at least one of acrylic resin, epoxy resin, polyimide resin, polyurethane resin, novolak resin, and siloxane resin.

The active matrix substrate of the present invention may be arranged such that the first pixel electrode and the scanning signal line partially overlap each other.

The active matrix substrate of the present invention may be arranged so as to further include a retention capacitor extension section extended from the retention capacitor line, the retention capacitor extension section being extended from the retention capacitor line in such a manner that the retention capacitor extension section is along the data signal line and overlaps an edge of the second pixel electrode or runs outside the edge.

The active matrix substrate of the present invention may be arranged such that a gap between the first pixel electrode and the second pixel electrode has a function for controlling alignment.

The active matrix substrate of the present invention may be arranged so as to further include a third pixel electrode in said each pixel region, the third pixel electrode being electrically connected with the first pixel electrode.

The active matrix substrate of the present invention may be arranged such that the first pixel electrode, the second pixel electrode, and the third pixel electrode are aligned in this order along a direction in which the data signal line extends.

An active matrix substrate of the present invention includes: a transistor connected with a scanning signal line; and a retention capacitor line, each pixel region including: a first pixel electrode connected with one conductive electrode of the transistor; a second pixel electrode overlapping the retention capacitor line; and a coupling capacitance electrode overlapping the retention capacitor line and the second pixel electrode, one conductive electrode or the other conductive electrode of the transistor being electrically connected with the coupling capacitance electrode, and at a part of a region where the second pixel electrode overlaps the retention capacitor line but does not overlap the coupling capacitance electrode, at least one of a plurality of insulating films provided between the retention capacitor line and the second pixel electrode being thinner than a region surrounding said at least one of the plurality of insulating films.

A liquid crystal panel of the present invention includes the active matrix substrate and a counter substrate facing the active matrix substrate, the counter substrate having a convexity on its surface, the convexity facing a region of the active matrix substrate where the interlayer insulating film is thin.

A liquid crystal panel of the present invention includes the active matrix substrate and a counter substrate facing the active matrix substrate, the counter substrate having a convexity on its surface, the convexity facing a region of the active matrix substrate where the gate insulating film is thin.

The liquid crystal panel of the present invention may be arranged such that the retention capacitor line extends in a row direction, and when the convexity of the surface of the counter substrate is projected onto a layer where the retention capacitor line is provided, the projected convexity is positioned between two edges of the retention capacitor line in a row direction.

A liquid crystal panel of the present invention includes the active matrix substrate. A liquid crystal display unit of the present invention includes the liquid crystal panel and a driver. A liquid crystal display device of the present invention includes the liquid crystal display unit and a light source device. A television receiver of the present invention includes the liquid crystal display device and a tuner section for receiving television broadcasting.

Advantageous Effects of Invention

As described above, the active matrix substrate is designed to prevent a short-circuit between a coupling capacitance electrode and an auxiliary capacitance electrode, thereby increasing a production yield of the active matrix substrate.

BRIEF DESCRIPTION OF DRAWINGS

FIG. 5 is an equivalent circuit diagram of the liquid crystal panel shown in FIG. 1.

FIG. 10 is a plane drawing showing still another specific example of the liquid crystal panel shown in FIG. 1 (specific example 3).

FIG. 11 is a cross sectional drawing of the liquid crystal panel taken along the line X-Y of FIG. 10.

FIG. 12 is a plane drawing showing still another specific example of the liquid crystal panel shown in FIG. 1 (specific example 4).

FIG. 14 is a plane drawing showing another specific example of the liquid crystal panel shown in FIG. 13.

FIG. 15 is a plane drawing showing still another specific example of the liquid crystal panel shown in FIG. 1 (specific example 6).

FIG. 16 is a plane drawing showing still another configuration of the liquid crystal panel of the present invention (specific example 7).

FIG. 17 is a plane drawing showing another specific example of the liquid crystal panel shown in FIG. 16.

FIG. 18 is a plane drawing showing another specific example of the liquid crystal panel shown in FIG. 8 (specific example 8).

FIG. 23 is a block diagram showing a whole configuration of the liquid crystal display device of the present invention.

DESCRIPTION OF EMBODIMENTS

Figure 1:
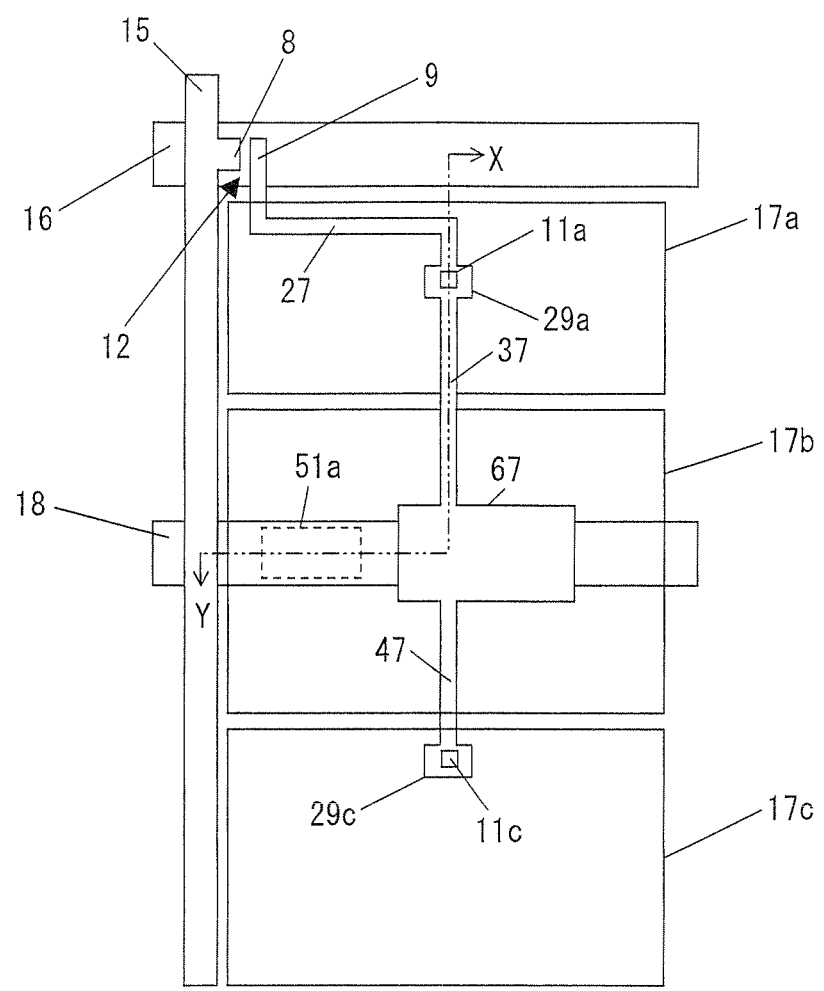
FIG. 1 is a plane drawing showing a configuration of a liquid crystal panel of the present invention (specific example 1).

An example of an embodiment of the present invention is explained below with reference to drawings. For convenience of explanation, a direction in which scanning signal lines extend is regarded as a row direction. Needless to say, when a liquid crystal display device including a liquid crystal display panel of the present invention (or an active matrix substrate used in the liquid crystal display panel) is used (viewed), scanning signal lines may extend either in a lateral direction or a longitudinal direction. In the drawings showing a liquid crystal display panel, an alignment-controlling structure is not shown if necessary.

FIG. 5 is an equivalent circuit diagram showing a part of a liquid crystal display panel in accordance with the present embodiment. As shown in FIG. 5, the liquid crystal display panel includes a data signal line 15 extending in a column direction (up-down direction in the drawing), a scanning signal line 16 extending in a row direction (right-left direction in the drawing), pixels (101-104) positioned in row and column directions, a retention capacitor line 18, and a common electrode (counter electrode) com. Each pixel has the same structure. A pixel column including the pixels 101 and 102 is adjacent to a pixel column including the pixels 103 and 104. A pixel row including the pixels 101 and 103 is adjacent to a pixel row including the pixels 102 and 104.

In the liquid crystal display panel, one data signal line 15, one scanning signal line 16, and one retention capacitor line 18 are provided with respect to each pixel. Three pixel electrodes (17a-17c) are provided with respect to one pixel, and the three pixel electrodes are aligned in a column direction.

For example, in the pixel 101, the pixel electrode 17a is connected with the data signal line 15 via a transistor 12 connected with the scanning signal line 16, the pixel electrodes 17a and 17c are electrically connected with each other, the pixel electrodes 17a and 17c are connected with the pixel electrode 17b via a coupling capacitance Cc, a retention capacitor Ch1 is formed between the pixel electrodes 17a and 17c and the retention capacitor line 18, a retention capacitor Ch2 is formed between the pixel electrode 17b and the retention capacitor line 18, a liquid crystal capacitor C11 is formed between the pixel electrodes 17a and 17c and the common electrode com, and a liquid crystal capacitor C12 is formed between the pixel electrode 17b and the common electrode com.

In the liquid crystal display device including the liquid crystal display panel, when the scanning signal line 16 is selected, the pixel electrode 17a gets connected with the data signal line 15 (via the transistor 12). Assume that potentials of the pixel electrodes 17a and 17c after the transistor 12 is made off are Vac and a potential of the pixel electrode 17b after the transistor 12 is made off is Vb. Since the pixel electrodes 17a and 17c are connected with the pixel electrode 17b via the coupling capacitance Cc, a relation |Vac|≥|Vb| is met (|Vb|, for example, indicates a difference in potential between Vb and Vcom (potential of com)). Consequently, a sub-pixel including the pixel electrode 17a serves as a bright sub-pixel, a sub-pixel including the pixel electrode 17b serves as a dark sub-pixel, and a sub-pixel including the pixel electrode 17c serves as a bright sub-pixel so that area coverage modulation of the two bright sub-pixels and the one dark sub-pixel allows displaying a half tone. This allows improving a viewing angle characteristic of the liquid crystal display device in accordance with the present embodiment.

Specific Example 1 of Liquid Crystal Panel

FIG. 1 shows a specific example of the pixel 101 shown in FIG. 5. In FIG. 1, for easier viewing, only members of an active matrix substrate are shown and members of a color filter substrate (counter substrate) are not shown. As shown in the drawing, the transistor 12 is provided near a portion where the data signal line 15 and the scanning signal line 16 cross each other, and three pixel electrodes (first-third pixel electrodes 17a-17c) and a coupling capacitance electrode 67 existing on the same layer as the data signal line exists are provided in a pixel region defined by the signal lines (15 and 16). The first-third pixel electrodes 17a-17c each has a rectangular shape, and aligned in this order in a column direction. The retention capacitor line 18 extends in a row direction in such a manner as to cross the center of a pixel (in such a manner as to overlap the second pixel electrode 17b). Further, the second pixel electrode 17b overlaps the retention capacitor line 18 via an insulating film (gate insulating film, interlayer insulating film) (not shown). The insulating film has a thin region 51a whose thickness is smaller than a thickness of other portions.

The coupling capacitance electrode 67 is positioned in such a manner as to overlap the retention capacitor line 18 via a gate insulating film (not shown), and overlaps the second pixel electrode 17b via an interlayer insulating film not shown). That is, the coupling capacitance electrode 67 is positioned below the second pixel electrode 17b, and the thin region 51a is positioned between one of two adjacent data signal lines (data signal line 15) and the coupling capacitance electrode 67. Further, a source electrode 8 of the transistor 12 is connected with the data signal line 15, a drain electrode 9 is connected with an extracting electrode 29a via a drain extracting line 27, and the extracting electrode 29a is connected with the coupling capacitance electrode 67 via an intermediate line 37 and is connected with the pixel electrode 17a via a contact hole 11a. The coupling capacitance electrode 67 is connected with an intermediate electrode 29c via an intermediate line 47, and the intermediate electrode 29c is connected with the pixel electrode 17c via a contact hole 11c. This configuration allows the drain electrode 9 of the transistor 12, the first pixel electrode 17a, and the coupling capacitance electrode 67 to be electrically connected with one another, so that a coupling capacitance Cc (see FIG. 5) is formed at a portion where the coupling capacitance electrode 67 and the second pixel electrode 17b overlap each other.

Further, a retention capacitor Ch1 is formed at a portion where the coupling capacitance electrode 67 and the retention capacitor line 18 overlap each other, and a retention capacitor Ch2 is formed at a portion at which the second pixel electrode 17b and the retention capacitor line 18 overlap each other and which corresponds to the thin region 51a.

Figure 2:
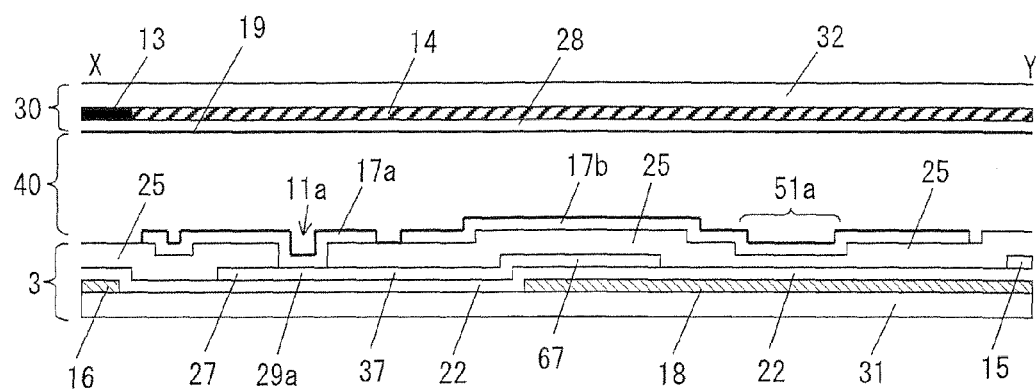
FIG. 2 is a cross sectional drawing of the liquid crystal panel taken along the line X-Y of FIG. 1.

FIG. 2 is a cross sectional drawing taken along a line X-Y of FIG. 1. As shown in FIG. 2, the liquid crystal panel in accordance with the present embodiment includes an active matrix substrate 3, a color filter substrate 30 facing the active matrix substrate 3, and a liquid crystal layer 40 provided between the two substrates (3 and 30). In the active matrix substrate 3, the scanning signal line 16 and the retention capacitor line 18 are provided on the glass substrate 31, and an inorganic gate insulating film 22 is provided so as to cover the scanning signal line 16 and the retention capacitor line 18. On the inorganic gate insulating film 22, there are provided the drain extracting line 27, the extracting electrode 29a, an intermediate line 37, the coupling capacitance electrode 67, and the data signal line 15. Although not shown in the cross section, on the inorganic gate insulating film 22, there are provided a semiconductor layer (i layer and n+ layer), and a source electrode and a drain electrode each adjacent to the n+ layer. Further, an inorganic interlayer insulating film 25 is provided in such a manner as to cover the metal layer. On the inorganic interlayer insulating film 25, there are provided the first and second pixel electrodes 17a and 17b, and an alignment film 19 is provided in such a manner as to cover these pixel electrodes. The inorganic interlayer insulating film 25 is penetrated at a contact hole 11a, which connects the pixel electrode 17a with the extracting electrode 29a. Further, the coupling capacitance electrode overlaps the pixel electrode 17b via the inorganic interlayer insulating film 25, so that the coupling capacitance Cc (see FIG. 5) is formed there. Further, the coupling capacitance electrode 67 overlaps the retention capacitor line 18 via the inorganic gate insulating film 22 so that retention capacitance Ch1 (see FIG. 5) is formed. At the thin region 51a, the second pixel electrode 17b overlaps the retention capacitor line 18 via the inorganic gate insulating film 22 and the inorganic interlayer insulating film 25 so that retention capacitance Ch2 (see FIG. 5) is formed.

On the other hand, in the color filter substrate 30, colored layer (color filter layer) 14 is provided on a glass substrate 32, a common electrode (com) 28 is provided on the colored layer 14, and the alignment film 19 is provided in such a manner as to cover the common electrode 28.

Figure 3:
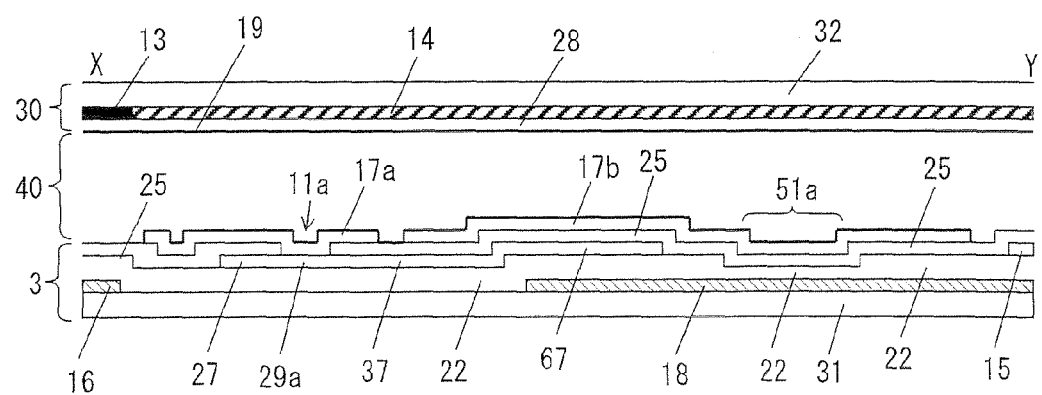
FIG. 3 is a cross sectional drawing showing another specific example of the liquid crystal panel taken along the line X-Y of FIG. 1.

The thin region 51a is formed by partially thinning the insulating film (inorganic gate insulating film 22 and the inorganic interlayer insulating film 25) between the second pixel electrode 17b and the retention capacitor line 18. As such, the thin region 51a may be formed by thinning the inorganic interlayer insulating film 25 as shown in FIG. 2 or may be formed by thinning the inorganic gate insulating film 22 as shown in FIG. 3. Alternatively, the thin region 51a may be formed by thinning both the inorganic interlayer insulating film 25 and the inorganic gate insulating film 22.

Figure 4:
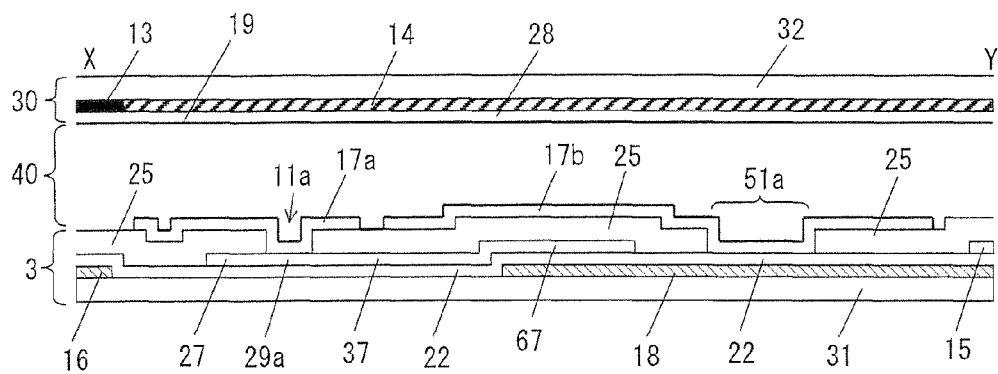
FIG. 4 is a cross sectional drawing showing another specific example of the liquid crystal panel taken along the line X-Y of FIG. 1.

Alternatively, the thin region 51a may be formed by partially removing the inorganic interlayer insulating film 25 out of the insulating film (inorganic gate insulating film 22 and the inorganic interlayer insulating film 25) between the second pixel electrode 17b and the retention capacitor line 18 as shown in FIG. 4. In this case, the thin region 51a is formed by overlapping the second pixel electrode on the retention capacitor line 18 via the inorganic gate insulating film 22.

In the configuration of FIG. 1, the thin region 51a is positioned to be adjacent to the coupling capacitance electrode 67 in a direction in which the scanning signal line 16 extends. However, the position of the thin region 51a is not limited to this configuration, and may be positioned on a region where a retention capacitor Ch2 (see FIG. 5) of the second pixel electrode 17b is formed. Accordingly, the thin region 51a may be positioned between the scanning signal line 16 and the coupling capacitance electrode 67 for example, according to the line width and position of the retention capacitor line 18.

(Driving Method)

Figure 6:
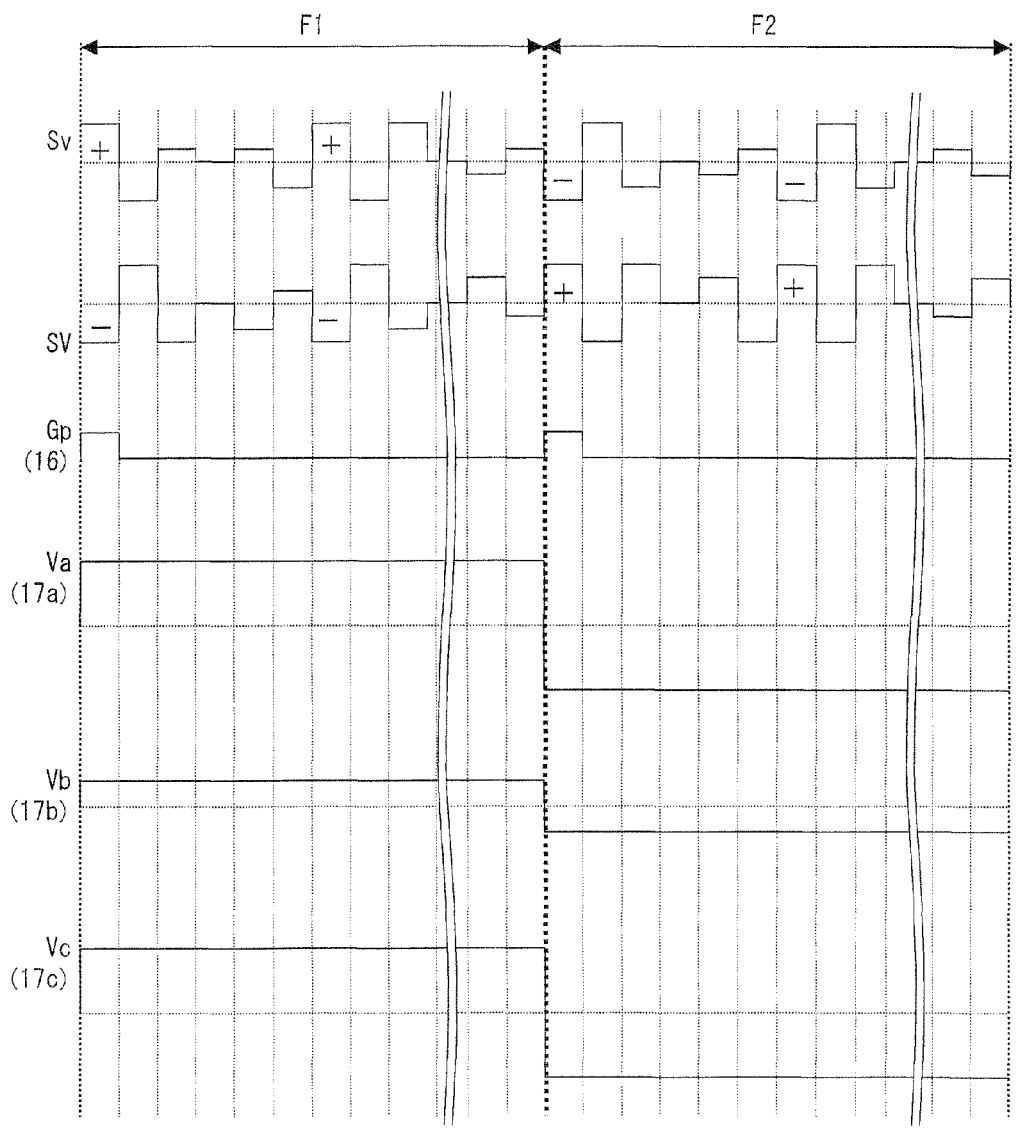
FIG. 6 is a timing chart showing how to drive a liquid crystal display device including the liquid crystal panel shown in FIG. 1.

FIG. 6 is a timing chart showing a driving method of the liquid crystal display device (normally black mode liquid crystal display device) in accordance with the present embodiment, including the liquid crystal panel shown in FIG. 1. Sv and SV indicate signal potentials supplied to two adjacent data signal lines, respectively. Gp indicates a gate-on pulse signal supplied to the scanning signal line 16. Va-Vc indicate potentials of the pixel electrodes 17a-17c, respectively.

In this driving method, as shown in FIG. 6, scanning signal lines are sequentially selected, the polarity of a signal potential supplied to a data signal line is inverted with respect to every one horizontal scanning period (1 H), the polarity of a signal potential supplied to a specific horizontal scanning period in individual frames is inverted with respect to every one frame, and signal potentials with different polarities are supplied to two adjacent data signal lines in one horizontal scanning period.

Figure 7:
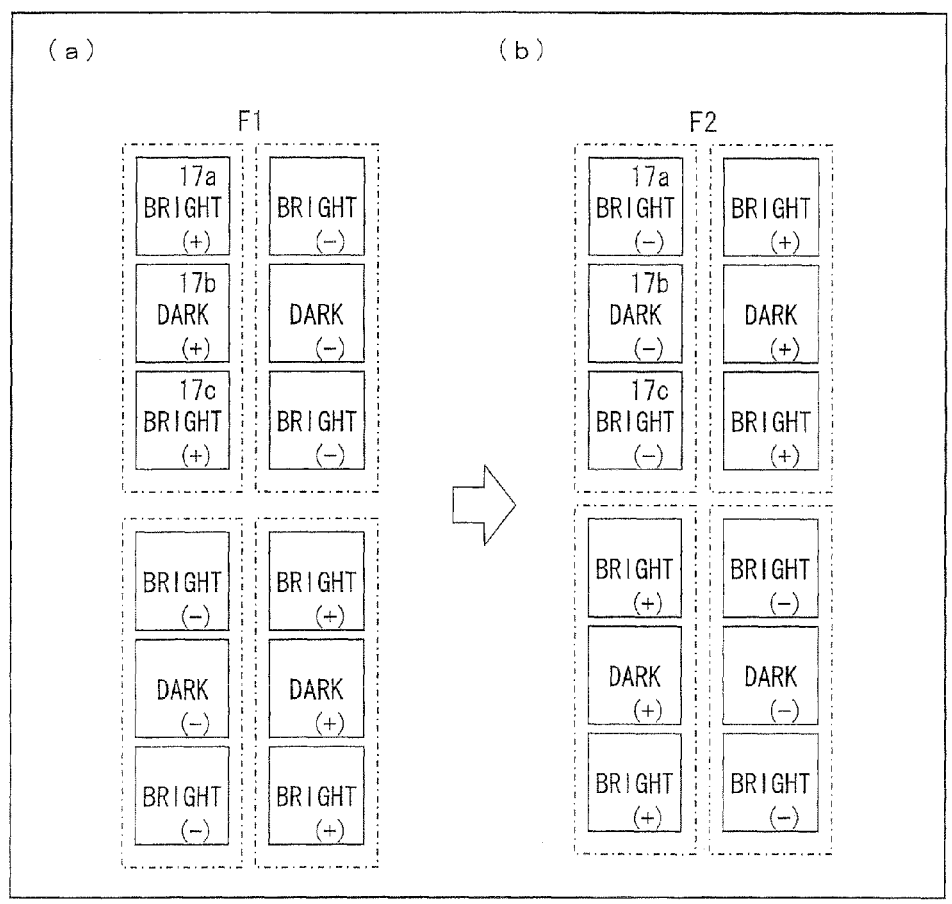
FIG. 7 is a drawing schematically showing a display state of each frame when the liquid crystal display device is driven as shown in FIG. 6.

Specifically, consecutive frames F1 and F2 are designed as follows: in F1, scanning signal lines are sequentially selected. To one of two adjacent data signal lines is supplied a signal potential with a plus polarity in 1st horizontal scanning period (including a writing period for the pixel electrode 17a for example) and a signal potential with a minus polarity in 2nd horizontal scanning period. To the other of the two adjacent data signal lines is supplied a signal potential with a minus polarity in 1st horizontal scanning period and a signal potential with a plus polarity in 2nd horizontal scanning period. Consequently, a relation |Va|=|Vc|≥|Vb| is met as shown in FIG. 6, so that the sub-pixel including the pixel electrode 17a (plus polarity) serves as a bright sub-pixel (hereinafter "bright"), the sub-pixel including the pixel electrode 17b (plus polarity) serves as a dark sub-pixel (hereinafter "dark"), and the sub-pixel including the pixel electrode 17c (plus polarity) serves as "bright". As a result, the pixels serve as "bright" and "dark" as shown in (a) of FIG. 7.

Further, in F2, scanning signal lines are sequentially selected. To one of two adjacent data signal lines is supplied a signal potential with a minus polarity in 1st horizontal scanning period (including a writing period for the pixel electrode 17a for example) and a signal potential with a plus polarity in 2nd horizontal scanning period. To the other of the two adjacent data signal lines is supplied a signal potential with a plus polarity in 1st horizontal scanning period and a signal potential with a minus polarity in 2nd horizontal scanning period. Consequently, a relation |Va|=|Vc|≥|Vb| is met as shown in FIG. 6, so that the sub-pixel including the pixel electrode 17a (minus polarity) serves as a bright sub-pixel (hereinafter "bright"), the sub-pixel including the pixel electrode 17b (minus polarity) serves as a dark sub-pixel (hereinafter "dark"), and the sub-pixel including the pixel electrode 17c (minus polarity) serves as "bright". As a result, the pixels serve as "bright" and "dark" as shown in (b) of FIG. 7.

Although alignment controlling structures are not shown in FIGS. 1-4, an MVA (Multidomain Vertical Alignment) liquid crystal panel is designed such that each pixel electrode has a slit for controlling alignment and a color filter substrate is provided with ribs for controlling alignment. Instead of the ribs for controlling alignment as above, a common electrode of a color filter substrate may be provided with slits for controlling alignment.

With the configuration of the liquid crystal panel shown in FIG. 1, the coupling capacitance electrode 67 is positioned below the second pixel electrode 17b (floating pixel electrode) and the thin region 51a overlaps the second pixel electrode 17b and the retention capacitor line 18 but does not overlap the coupling capacitance electrode 67. This configuration allows forming a retention capacitor without providing an electrode for forming a retention capacitor (auxiliary capacitance electrode), so that the retention capacitance between the second pixel electrode 17b and the retention capacitor line 18 does not drop. Consequently, it is possible to avoid a short-circuit between the control electrode 511 (coupling capacitance electrode 67) and the auxiliary capacitance electrode 512 seen in the conventional configuration (see FIG. 27).

The thin region 51a may be also positioned on a part of the inorganic interlayer insulating film 25 which part overlaps the coupling capacitance electrode 67. With this configuration, the area of the coupling capacitance electrode 67 for obtaining a desired coupling capacitance may be reduced. This enlarges a distance between the coupling capacitance electrode 67 and the data signal line, thereby reducing the possibility of a short-circuit between the coupling capacitance electrode 67 and the data signal line 15.

Since the inorganic interlayer insulating film 25 also serves as a protective film for protecting a channel of a transistor. Accordingly, the inorganic interlayer insulating film 25 may be arranged to be thick at portions other than a portion where the thin region 51a is positioned. This improves reliability of a transistor.

As described above, it is preferable to design the inorganic interlayer insulating film 25 to be thin in consideration of reducing the area of the coupling capacitance electrode 67 to obtain a desired capacitance. On the other hand, it is preferable to design the inorganic interlayer insulating film 25 to be thick in consideration of reliability of a transistor. In this regard, the above configuration can yield both the effects by positioning the thin region 51a at a part of the thick inorganic interlayer insulating film 25 which part overlaps the coupling capacitance electrode 67.

In order to yield the above effects, the inorganic interlayer insulating film 25 may be arranged such that the inorganic interlayer insulating film 25 has a two-layered structure and the upper layer is removed or thinned at a portion where the coupling capacitance electrode 67 and the second pixel electrode 17b overlap each other.

Effects similar to the above effects can be yielded also in the configuration of positioning the thin region 51a on the inorganic gate insulating film 22. That is, by providing the thin region 51a at a part of the thick inorganic gate insulating film 22 which part overlaps the coupling capacitance electrode 67, it is possible to obtain a desired capacitance while preventing a short-circuit at a cross section of the scanning signal line 16 and the data signal line 15 and preventing an increase in a parasitic capacitance at the cross section. As with the case of the inorganic interlayer insulating film 25 having the two-layered structure, the inorganic gate insulating film 22 may have a two-layered structure.

(Method for Producing Liquid Crystal Panel)

The following explains a process for producing the liquid crystal panel of the present invention. The process includes an active matrix substrate producing step, a color filter substrate producing step, and a fabricating step of attaching the substrates to each other and filling the space between the substrates with liquid crystal to make the liquid crystal panel.

Initially, a metal film such as titanium, chrome, aluminum, molybdenum, tantalum, tungsten, and copper, an alloy film thereof, or a laminate film thereof (with a thickness of 1000 Å-3000 Å) is formed on a substrate made of glass, plastic etc. by sputtering. Thereafter, the film thus formed is patterned by a photolithography technique (Photo Engraving Process. Hereinafter referred to as "PEP technique") to form scanning signal lines, gate electrodes of transistors (in some cases, scanning signal lines double as gate electrodes), and retention capacitor lines.

Subsequently, an inorganic insulating film (with a thickness of approximately 3000 Å-5000 Å) made of silicon nitride or silicon oxide is formed by CVD (Chemical Vapor Deposition) on the whole substrate on which the scanning signal lines have been formed, thereby forming a gate insulating film.

Subsequently, on the gate insulating film (whole substrate), an intrinsic amorphous silicon film (with a thickness of 1000 Å-3000 Å) and an n+ amorphous silicon film (with a thickness of 400 Å-700 Å) doped with phosphorous are continuously formed. Thereafter, the films thus formed are patterned by the PEP technique so as to form a silicon laminate made of an intrinsic amorphous silicon layer and an n+ amorphous silicon layer in such a manner that the silicon laminate has an insular shape.

Subsequently, on the substrate where the silicon laminate has been formed, a metal film such as titanium, chrome, aluminum, molybdenum, tantalum, tungsten, and copper, an alloy film thereof, or a laminate film thereof (with a thickness of 1000 Å-3000 Å) is formed by sputtering. Thereafter, the film thus formed is patterned by the PEP technique so as to form data signal lines, source electrodes and drain electrodes of transistors, drain extracting lines, extracting electrodes, intermediate lines, and coupling capacitance electrodes.

Further, using the source electrodes and the drain electrodes as masks, the n+ amorphous silicon layer constituting the silicon laminate is removed by etching so as to form channels for the transistors. The semiconductor layer may be made of the amorphous silicon film as described above. Alternatively, the semiconductor layer may be made of a polysilicon film, or may be made of an amorphous silicon film and a polysilicon film each subjected to a laser annealing in order to improve crystallinity. This increases the moving velocity of electrons in the semiconductor layer, which improves characteristics of the transistor (TFT).

Subsequently, on the whole substrate where the data signal lines etc. have been formed, an inorganic insulating film (with a thickness of 2000 Å-5000 Å) made of silicon nitride or silicon oxide is formed by CVD so as to form an inorganic interlayer insulating film.

Thereafter, the interlayer insulating film is removed by etching by the PEP technique to form contact holes and the thin region 51*a*. Half exposure may be carried out so that the interlayer insulating film remains thinly at the thin region 51*a*. Then, a transparent conductive film (with a thickness of 1000 Å-2000 Å) made of ITO (Indium Tin Oxide), IZO (Indium Zinc Oxide), zinc oxide, or tin oxide etc. is formed by sputtering on the whole substrate so as to be on the interlayer insulating film where the contact holes and the thin region 51*a* have been formed. Thereafter, the transparent conductive film is patterned by the PEP technique to form pixel electrodes.

Lastly, polyimide resin with a thickness of 500 Å-1000 Å is printed on the whole substrate so as to be on the pixel electrodes and thereafter sintered and subjected to a one-direction rubbing treatment by a rotating cloth so as to form an alignment film. Thus, the active matrix substrate is produced.

The following explains the step of producing a color filter substrate.

Initially, a chrome thin film or resin containing a black pigment is formed on a substrate (whole substrate) made of glass, plastic etc. and then the film thus formed is patterned by the PEP technique to form black matrices. Then, at spaces between the black matrices, red, green, and blue color layers (with a thickness of 2 μm or so) are pattern-formed by pigment dispersion etc.

Subsequently, a transparent conductive film (with a thickness of 1000 Å or so) made of ITO, IZO, zinc oxide, or tin oxide etc. is formed on the whole substrate to be on the color filter layers to form a common electrode (com).

Lastly, polyimide resin with a thickness of 500 Å-1000 Å is printed on the whole substrate so as to be on the common electrode, and then sintered and subjected to a one-direction rubbing treatment by a rotating cloth so as to form an alignment film. Thus, the color filter substrate is produced.

The following explains the fabricating step.

Initially, a sealing material made of thermosetting epoxy resin is applied by screen printing to one of the active matrix substrate and the color filter substrate in such a manner that the sealing material forms a frame pattern with a cut via which liquid crystal is to be injected, and spherical spacers made of plastic or silica with a diameter corresponding to the thickness of the liquid crystal layer are dispersed on the other of the substrates.

Subsequently, the active matrix substrate and the color filter substrate are attached to each other and the sealing material is cured.

Lastly, a liquid crystal material is poured into a space surrounded by the active matrix substrate, the color filter substrate, and the sealing material by a vacuum method, and then UV curing resin is applied to the part via which liquid crystal has been poured, and the substrates are subjected to UV radiation to form a liquid crystal layer therebetween. Thus, the liquid crystal panel is produced.

Specific Example 2 of Liquid Crystal Panel

Figure 8:
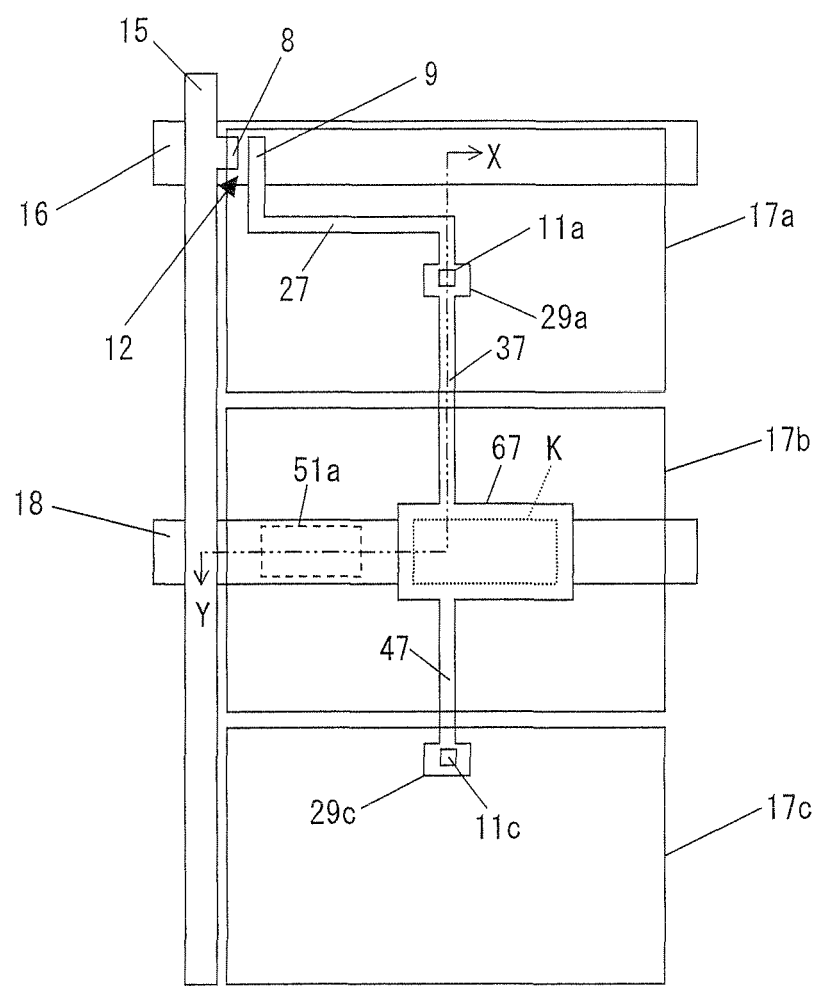
FIG. 8 is a plane drawing showing another specific example of the liquid crystal panel shown in FIG. 1 (specific example 2).
Figure 9:
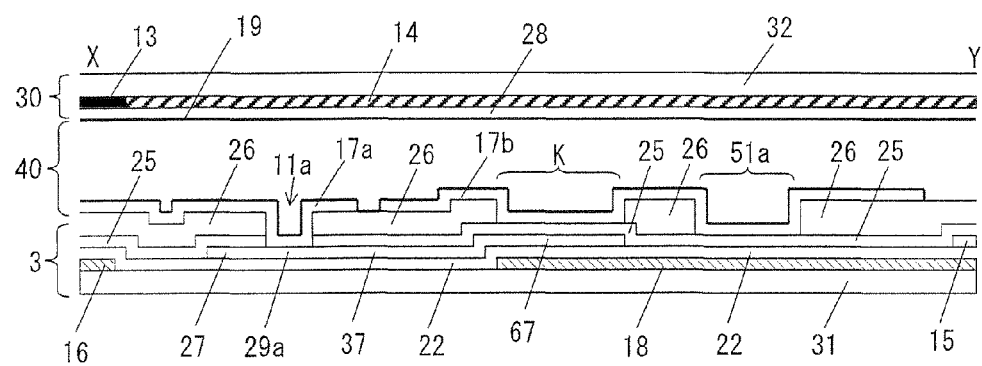
FIG. 9 is a cross sectional drawing of the liquid crystal panel taken along the line X-Y of FIG. 8.

The interlayer insulating film (channel protecting film) may be arranged such that an organic interlayer insulating film 26 thicker than the inorganic interlayer insulating film 25 in FIG. 2 is formed on the inorganic interlayer insulating film 25 so that the interlayer insulating film has a two-layered (25 and 26) structure as shown in FIG. 9. This yields the effects of reducing various parasitic capacitances, preventing a short-circuit between lines, and reducing crack etc. in the pixel electrode by making the layers under the pixel electrode flat. In this case, as shown in FIGS. 8 and 9, it is preferable to design the organic interlayer insulating film 26 such that a portion K overlapping the coupling capacitance electrode 67 is removed. This configuration allows yielding the above effects while securing a sufficient amount of the coupling capacitance (Cc in FIG. 5). In this configuration, a parasitic capacitance between the scanning signal line and the pixel electrode is reduced. Accordingly, it is possible to increase an open area ratio by overlapping the scanning signal line 16 and the first pixel electrode 17*a* as shown in FIGS. 8 and 9.

The inorganic interlayer insulating film 25, the organic interlayer insulating film 26, the contact hole 11*a*, and the thin region 51*a* in FIG. 9 may be formed as follows for example. Transistors and data signal lines are formed on a substrate, and then the inorganic interlayer insulating film 25 (passivation film) made of SiNx with a thickness of approximately 3000 Å is formed to cover the whole substrate by CVD using a mixture gas of $SiH_4$ gas, $NH_3$ gas, and $N_2$ gas. Thereafter, the organic interlayer insulating film 26 made of positive photosensitive acrylic resin with a thickness of approximately 3 μm is formed by spin coating or die coating. Thereafter, the organic interlayer insulating film 26 is subjected to photolithography so that a hollowed part of the organic interlayer insulating film 26, the thin region 51*a*, and various patterns for contact are formed. Further, using the patterned organic interlayer insulating film 26 as a mask, the inorganic interlayer insulating film 25 is dry-etched using a mixture gas of $CF_4$ gas and $O_2$ gas. Specifically, the photolithography process is carried out in such a manner that the hollowed part of the organic interlayer insulating film 26 and the thin region 51*a* are made by half exposure so that the organic interlayer insulating film remains thinly in the hollowed part when the development is completed, whereas the contact holes are made by full exposure so that the organic interlayer insulating film does not remain in the contact holes when the development is completed. At this stage, dry etching using the mixture gas of $CF_4$ gas and $O_2$ gas removes the remaining film (of the organic interlayer insulating film) at the hollowed part of the organic interlayer insulating film and at the thin region 51a and the inorganic interlayer insulating film which was below the organic interlayer insulating film at the contact holes. The organic interlayer insulating film 26 may be an insulating film made of an SOG (spin on glass) material. The organic interlayer insulating film 26 may include at least one of acrylic resin, epoxy resin, polyimide resin, polyurethane resin, novolak resin, and siloxane resin.

Specific Example 3 of Liquid Crystal Panel

The gate insulating film may be arranged such that an organic gate insulating film 21 thicker than the inorganic gate insulating film 22 in FIG. 2 is formed below the inorganic gate insulating film 22 so that the gate insulating film has a two-layered (21 and 22) structure as shown in FIG. 11. This yields the effects of reducing various parasitic capacitances, preventing a short-circuit between lines, and reducing disconnection of data signal lines, drain extracting lines etc. by making the layers under the data signal lines, the drain extracting lines etc. flat. In this case, as shown in FIGS. 10 and 11, it is preferable to design the organic gate insulating film 21 such that a portion overlapping the coupling capacitance electrode 67 and a portion overlapping the second pixel electrode 17b and the retention capacitor line 18 (thin region 51a) are removed (hollowed part F). This configuration allows yielding the above effects while securing a sufficient amount of the coupling capacitance (Ch1 and Ch2 in FIG. 5). In this configuration, a parasitic capacitance between the scanning signal line and the pixel electrode is reduced. Accordingly, it is possible to increase an open area ratio by overlapping the scanning signal line 16 and the first pixel electrode 17a as shown in FIGS. 10 and 11.

Specific Example 4 of Liquid Crystal Panel

FIG. 12 is a plane drawing showing another configuration of the liquid crystal panel of the present invention. The liquid crystal panel shown in FIG. 12 is designed such that an insulating film overlapping the retention capacitor line 18 and the second pixel electrode 17b includes first-third regions which are aligned in this order in a direction in which the scanning signal line 16 extends, the first region has a thin region 51a, the second region has a portion where the coupling capacitance electrode 67 and the second pixel electrode 17b overlap each other, and the third region has a thin region 51b.

With the arrangement, the thin region 51a is provided between one of adjacent two data signal lines (data signal line 15) and the coupling capacitance electrode 67, and the thin region 51b is provided between the other of the adjacent two data signal lines and the coupling capacitance electrode 67. Consequently, a retention capacitor Ch1 is formed at a portion where the coupling capacitance electrode 67 and the retention capacitor line 18 overlap each other, and a retention capacitor Ch2 is formed at portions at which the second pixel electrode 17b and the retention capacitor line 18 overlap each other and which correspond to the thin regions 51a and 51b, respectively. This prevents the retention capacitance between the second pixel electrode 17b and the retention capacitor line 18 to be reduced, and avoids a short-circuit between the control electrode 511 (coupling capacitance electrode 67) and the auxiliary capacitance electrode 512 as seen in the conventional configuration (see FIG. 27). Further, since the thin regions 51a and 51b are formed between the coupling capacitance electrode 67 and the data signal line 15, a short-circuit between the coupling capacitance electrode 67 and the data signal lines (one of the adjacent two data signal lines (data signal line 15) and the other) is less likely to occur.

Specific Example 5 of Liquid Crystal Panel

Figure 13:
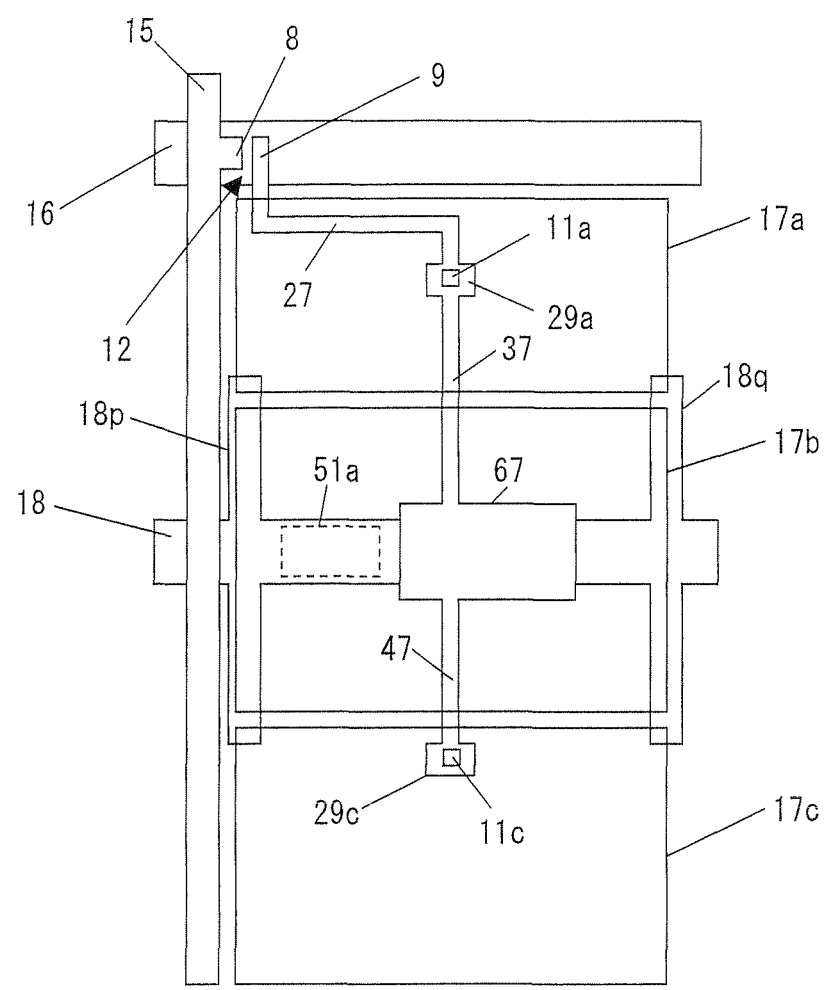
FIG. 13 is a plane drawing showing still another specific example of the liquid crystal panel shown in FIG. 1 (specific example 5).

FIG. 13 is a plane drawing showing another configuration of the liquid crystal panel of the present invention. The liquid crystal panel shown in FIG. 13 is designed such that a retention capacitor line extension 18p which extends along the data signal line 15 on a plane view and a retention capacitor line extension 18q which extends along a data signal line adjacent to the data signal line 15 on the plane view extend from the retention capacitor line 18 and that the retention capacitor line extension 18p overlaps one of two edges of the second pixel electrode 17b which edges are along the data signal lines (an edge closer to the data signal line 15), and the retention capacitor line extension 18q overlaps the other of the two edges. Consequently, the retention capacitor line extensions 18p and 18q serve as shield electrodes of the pixel electrode 17b (floating pixel electrode), more effectively preventing electric charge from coming into the pixel electrode 17b. This allows preventing image sticking of the sub-pixel including the pixel electrode 17b (dark sub-pixel).

The liquid crystal panel in FIG. 13 may be arranged such that the interlayer insulating film (channel protecting film) has a two-layered structure including an inorganic interlayer insulating film and an organic interlayer insulating film. This configuration yields effects such as reduction of various parasitic capacitances, prevention of a short-circuit between lines, and reduction of breakage etc. of a pixel electrode by making the layers under the pixel electrode flat. In this case, as shown in FIG. 14, it is preferable to design the organic interlayer insulating film such that a portion K overlapping the coupling capacitance electrode 67 and portions R1 and R2 overlapping the retention capacitor line extensions 18p and 18q are removed. This configuration allows yielding the above effects while securing a sufficient amount of coupling capacitance (Cc in FIG. 5) and securing the shield effect yielded by the retention capacitor line extensions 18p and 18q. In this configuration, since parasitic capacitance between the scanning signal line and the pixel electrode is reduced, it is possible to increase an open area ratio by overlapping the scanning signal line 16 and the first pixel electrode 17a as shown in FIG. 14.

Specific Example 6 of Liquid Crystal Panel

FIG. 15 is a plane drawing showing another configuration of the liquid crystal panel of the present invention. As shown in the drawing, the liquid crystal panel in FIG. 1 may be modified by removing the third pixel electrode 17c, the intermediate line 47, the intermediate electrode 29c, and the contact hole 11c. A liquid crystal display device including the liquid crystal panel in FIG. 15 can display a halftone by an area coverage modulation of one bright sub-pixel which is a sub-pixel including the pixel electrode 17a and one dark sub-pixel which is a sub-pixel including the pixel electrode 17b.

Specific Example 7 of Liquid Crystal Panel

FIG. 16 is a plane drawing showing another configuration of the liquid crystal panel of the present invention. As shown in the drawing, in a pixel region defined by the data signal line 15 and the scanning signal line 16, a second pixel electrode 17b having a trapezoidal shape as seen from a row direction and a first pixel electrode 17a having a shape to which the second pixel electrode 17b fits are aligned in a row direction, and the retention capacitor line 18 extends in a row direction in such a manner as to cross the center of a pixel (to overlap the second pixel electrode 17b).

That is, the circumference of the second pixel electrode 17b is composed of a first side which crosses the retention capacitor line 18 and forms an angle of approximately 90° with respect to a row direction, a second side which extends from one end of the first side in such a manner as to form an angle of approximately 45° with respect to a row direction, a third side which extends from the other end of the first side in such a manner as to form an angle of approximately 315° with respect to a row direction, and a fourth side which is parallel to the first side and crosses the retention capacitor line 18. The first side forms an upper base of the trapezoid and the fourth side forms a lower base of the trapezoid, and a line connecting medians of the first side and the fourth side runs on the retention capacitor line 18.

Further, the circumference of the first pixel electrode 17a is composed of a side along the data signal line 15, a side along the scanning signal line 16, a side along a scanning signal line adjacent to the scanning signal line 16, and three sides facing the first-third sides of the second pixel electrode 17b. A gap between the first side of the second pixel electrode 17b and the side of the first pixel electrode 17a which side faces the first side of the second pixel electrode 17b is referred to as a first gap S1, a gap between the second side of the second pixel electrode 17b and the side of the first pixel electrode 17a which side faces the second side of the second pixel electrode 17b is referred to as a second gap S2, and a gap between the third side of the second pixel electrode 17b and the side of the first pixel electrode 17a which side faces the third side of the second pixel electrode 17b is referred to as a third gap S3.

Also in the present liquid crystal panel, the second pixel electrode 17b overlaps the retention capacitor line 18 via an insulating film (gate insulating film, interlayer insulating film) (not shown), and the insulating film has a thin region 51a. The coupling capacitance electrode 67 is provided in such a manner as to overlap the retention capacitor line 18 via a gate insulating film (not shown), and overlaps the second pixel electrode 17b via an interlayer insulating film (not shown). That the coupling capacitance electrode 67 is positioned below the second pixel electrode 17b, and the thin region 51a is positioned between one of two adjacent data signal lines (data signal line 15) and the coupling capacitance electrode 67. Further, a source electrode 8 of the transistor 12 is connected with the data signal line 15, a drain electrode 9 is connected with the extracting electrode 29a via a drain extracting line 27, and the extracting electrode 29a is connected with the coupling capacitance electrode 67 via the intermediate line 37 and is connected with the pixel electrode 17a via a contact hole 11a. This configuration allows the drain electrode 9 of the transistor 12, the first pixel electrode 17a, and the coupling capacitance electrode 67 to be electrically connected with one another, so that coupling capacitance Cc (see FIG. 5) is formed at a portion where the coupling capacitance electrode 67 and the second pixel electrode 17b overlap each other.

Further, a retention capacitor Ch1 is formed at a portion where the coupling capacitance electrode 67 and the retention capacitor line 18 overlap each other, and a retention capacitor Ch2 is formed at a portion at which the second pixel electrode 17b and the retention capacitor line 18 overlap each other and which corresponds to the thin region 51a.

Further, a retention capacitor line extension 18p extends from the retention capacitor line 18 in such a manner as to be along the data signal line 15 on a plane view, and a retention capacitor line extension 18q extends from the retention capacitor line 18 in such a manner as to be along the data signal line adjacent to the data signal line 15 on a plane view. The retention capacitor line extension 18p overlaps the first side of the circumference of the second pixel electrode 17b, and the retention capacitor line extension 18q overlaps the fourth side of the circumference of the second pixel electrode 17b.

Figure 27:
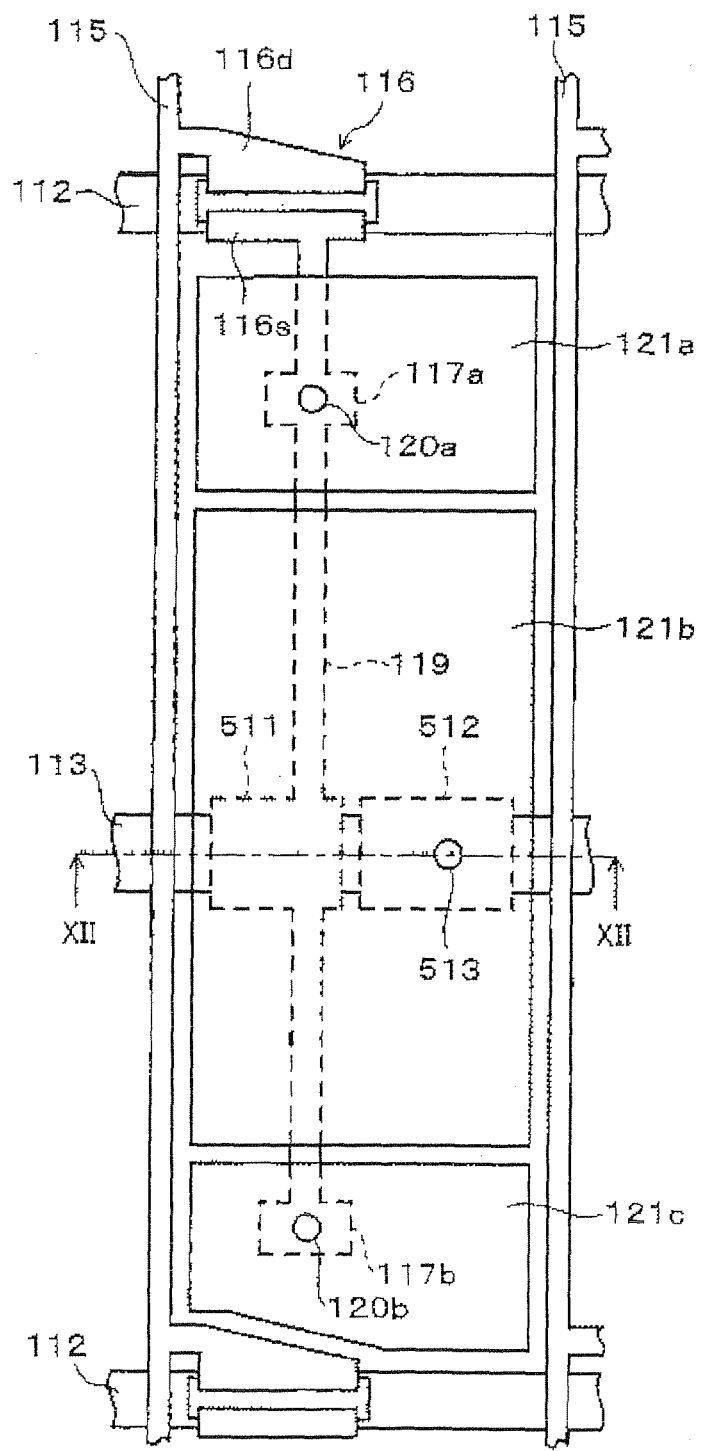
FIG. 27 is a plane drawing showing a configuration of a conventional liquid crystal panel.

In the liquid crystal panel shown in FIG. 16, it is possible to avoid a short-circuit between the control electrode 511 (coupling capacitance electrode 67) and the auxiliary capacitance electrode 512 as seen in the conventional configuration (see FIG. 27).

In a case where the liquid crystal panel in FIG. 16 is used based on MVA, the second gap S2 or the third gap S3 may serve as an alignment controlling structure. Further, since the retention capacitor line extensions 18p and 18q serve as shield electrodes of the pixel electrode 17b (floating pixel electrode), it is possible to more effectively prevent electric charge from coming into the second pixel electrode 17b. This allows preventing image sticking of the sub-pixel including the pixel electrode 17b (dark sub-pixel).

The liquid crystal panel in FIG. 16 may be arranged such that the interlayer insulating film (channel protecting film) has a two-layered structure including an inorganic interlayer insulating film and an organic interlayer insulating film. This configuration yields effects such as reduction of various parasitic capacitances, prevention of a short-circuit between lines, and reduction of breakage etc. of a pixel electrode by making the layers under the pixel electrode flat. In this case, as shown in FIG. 17, it is preferable to design the organic interlayer insulating film such that a portion K overlapping the coupling capacitance electrode 67 and portions W1 and W2 overlapping the retention capacitor line extensions 18p and 18q are removed. This configuration allows yielding the above effects while securing a sufficient amount of coupling capacitance (Cc in FIG. 5) and securing the shield effect yielded by the retention capacitor line extensions 18p and 18q. In this configuration, since a parasitic capacitance between the scanning signal line and the pixel electrode is reduced, it is possible to increase an open area ratio by overlapping the scanning signal line 16 and the first pixel electrode 17a as shown in FIG. 17.

Specific Example 8 of Liquid Crystal Panel

Figure 19:
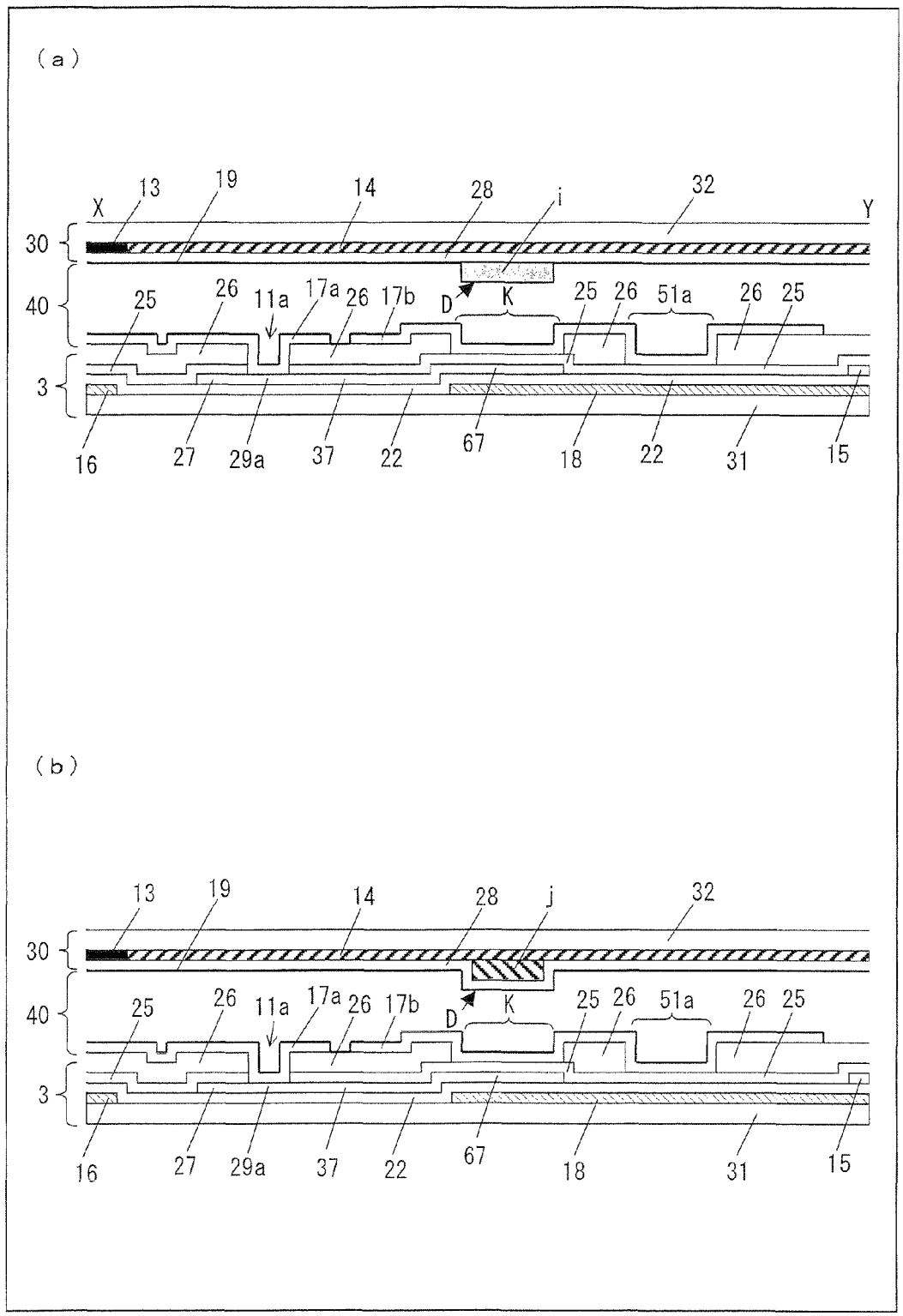
FIG. 19 is a cross sectional drawing of the liquid crystal panel taken along the line X-Y of FIG. 18.

The liquid crystal panel shown in FIGS. 8 and 9 may be modified to be a one shown in FIGS. 18 and 19. The liquid crystal panel shown in FIGS. 18 and 19 is designed such that a surface of a color filter substrate has a protrusion D corresponding to a hollowed part K of an organic interlayer insulating film 26 of the active matrix substrate 3. This configuration allows compensating a recess on the surface of the active matrix substrate which is made by the hollowed part K, allowing a liquid crystal layer under the protrusion D to have substantially the same thickness as its surroundings. This allows the liquid crystal layer to have a uniform thickness, which reduces the amount of used liquid crystal. In (a) of FIG. 19, a protruding member i is provided on the counter electrode 28 to serve as the protrusion D. This allows preventing a short-circuit between the second pixel electrode 17b and the counter electrode 28 even if a conductive foreign matter falls in the recess on the surface of the active matrix substrate which recess is caused by the hollowed part K. In a case of a liquid crystal panel based on MVA, the protruding member i may be made in the same step as that for ribs for alignment control. In (b) of FIG. 19, a protruding member j is formed on a colored layer 14 (under a counter electrode 28) to serve as the protrusion D on the surface of the color filter substrate. The protruding member j may be a colored layer with a color different from that of the colored layer 14 so that the protrusion D is made by overlapping these colored layers (e.g. a colored layer of R and a colored layer of G). The configuration in (b) of FIG. 19 allows making the distance between the second pixel electrode 17b and the counter electrode 28 under the protrusion D shorter than the case where the protrusion D is not provided. This allows increasing liquid crystal capacitance.

As shown in FIG. 18, in order that alignment defect caused by the protrusion D of the color filter substrate is less visible, it is desirable to position the protrusion D in such a manner that projection of the protrusion D onto a layer where the retention capacitor line 18 is formed is positioned between two edges of the retention capacitor line 18 in a row direction.

Specific Example 9 of Liquid Crystal Panel

Figure 20:
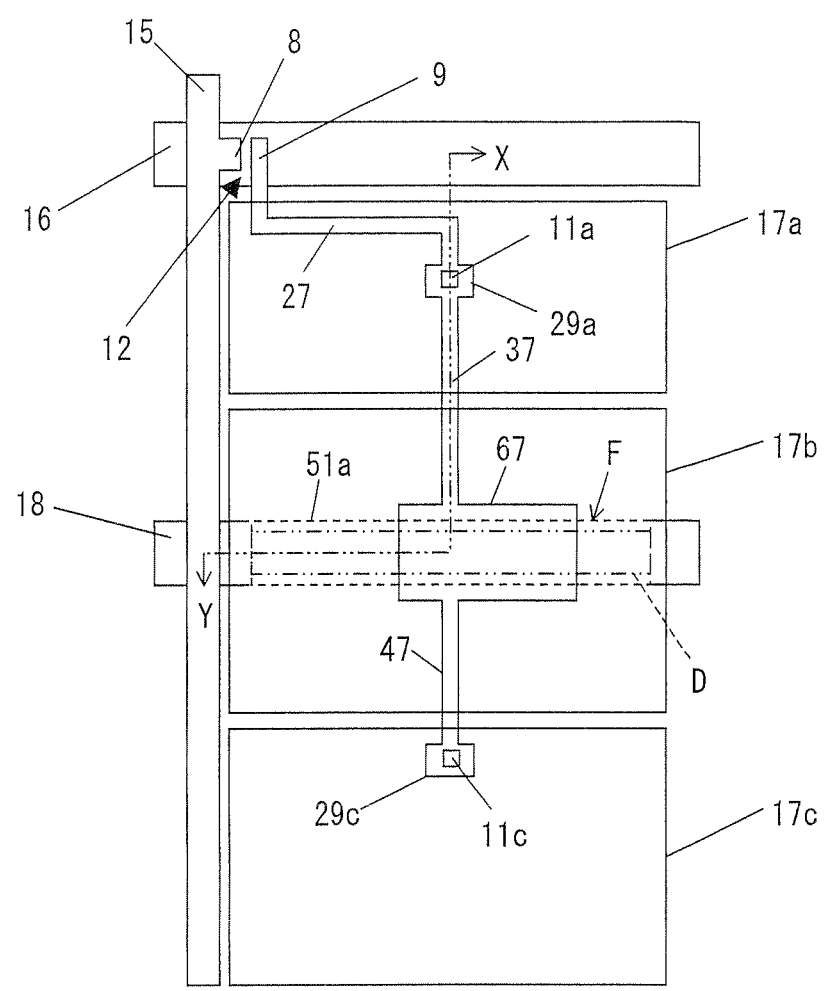
FIG. 20 is a plane drawing showing another specific example of the liquid crystal panel shown in FIG. 10 (specific example 9).
Figure 21:
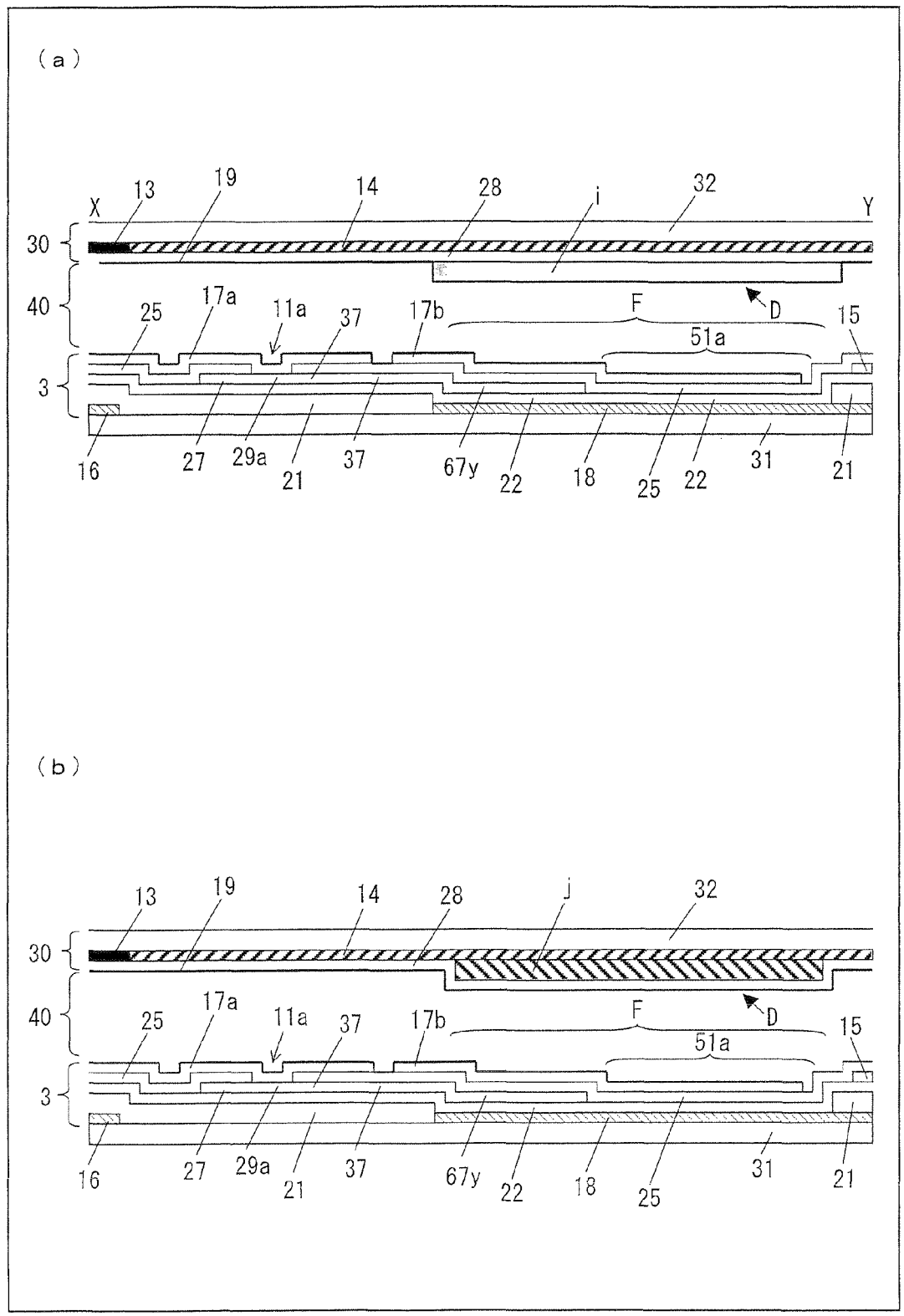
FIG. 21 is a cross sectional drawing of the liquid crystal panel taken along the line X-Y of FIG. 20.

The liquid crystal panel shown in FIGS. 10 and 11 may be modified to be a one shown in FIGS. 20 and 21. The liquid crystal panel shown in FIGS. 20 and 21 is designed such that a surface of a color filter substrate has a protrusion D facing a hollowed part F of an organic gate insulating film 21 of the active matrix substrate 3. This configuration allows compensating a recess on the surface of the active matrix substrate which recess is made by the hollowed part F, allowing a liquid crystal layer under the protrusion D to have substantially the same thickness as its surroundings. This allows the liquid crystal layer to have a uniform thickness, which reduces the amount of used liquid crystal. In (a) of FIG. 21, a protruding member i is provided on the counter electrode 28 to serve as the protrusion D. This allows preventing a short-circuit between the second pixel electrode 17b and the counter electrode 28 even if a conductive foreign matter falls in the recess on the surface of the active matrix substrate which recess is caused by the hollowed part F. In a case of a liquid crystal panel based on MVA, the protruding member i may be made in the same step as that for a rib for alignment control. In (b) of FIG. 21, a protruding member j formed on a colored layer 14 (under a counter electrode 28) to serve as the protrusion D on the surface of the color filter substrate. The protruding member j may be a colored layer with a color different from that of the colored layer 14 so that the protrusion D is made by overlapping these colored layers (e.g. a colored layer of R and a colored layer of G). The configuration in (b) of FIG. 21 allows making the distance between the second pixel electrode 17b and the counter electrode 28 under the protrusion D shorter than the case where the protrusion D is not provided. This allows increasing liquid crystal capacitance.

As shown in FIG. 20, in order that alignment defect caused by the protrusion D of the color filter substrate is less visible, it is desirable to position the protrusion D in such a manner that projection of the protrusion D onto a layer where the retention capacitor line 18 is formed is positioned between two edges of the retention capacitor line 18 in a row direction.

Specific Example 10 of Liquid Crystal Panel

Figure 28:
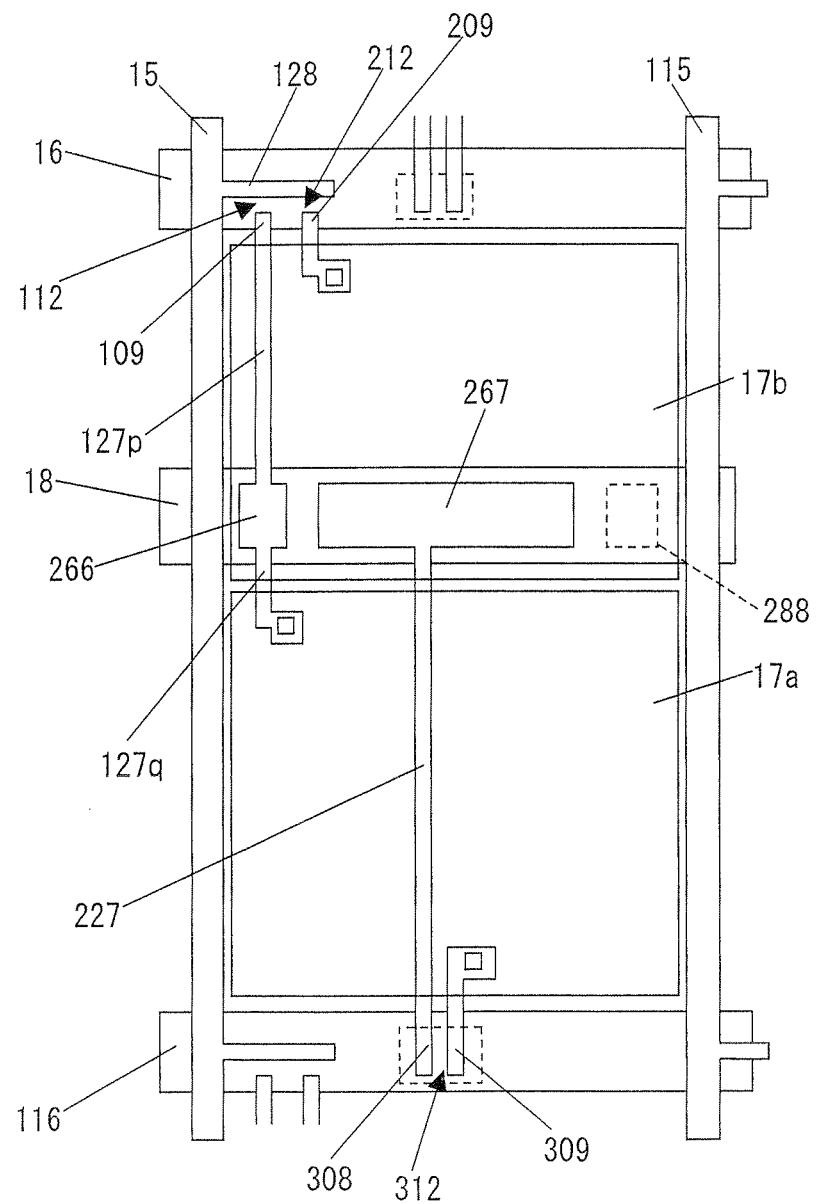
FIG. 28 is a plane drawing showing another specific example of the liquid crystal panel shown in FIG. 1 (specific example 10).

FIG. 28 is a plane drawing showing another configuration of the liquid crystal panel of the present invention. An active matrix substrate of a liquid crystal panel shown in FIG. 28 includes transistors 112 and 212 each connected with a scanning signal line 16 and a transistor 312 connected with a scanning signal line 116 which is next to the scanning signal line 16. One pixel region includes pixel electrodes 17a and 17b and two capacitor electrodes 266 and 267. Here, each of the capacitor electrodes 266 and 267 overlaps a retention capacitor line 18 via a gate insulating film, and overlaps the pixel electrode 17b via a channel protecting film. A source electrode 308 of the transistor 312 is connected with the capacitor electrode 267 via an extracting electrode 227, and a drain electrode 309 of the transistor 312 is connected with the pixel electrode 17a via a contact hole. In an overlapping portion 288 where the pixel electrode 17b does not overlap the capacitor electrodes 266 and 277 but overlap the retention capacitor line 18, at least one of a gate insulating film and a channel protecting film is thinner than its surroundings.

Specifically, around the overlapping portion 288, the channel protecting film consists of an inorganic insulating film and an organic insulating film thicker than the inorganic insulating film, whereas at the overlapping portion 288, the organic insulating film is removed and the retention capacitor line 18 and the pixel electrode 17b overlap each other only via the gate insulating film and the inorganic insulating film. A common source electrode 128 of the transistors 112 and 212 is connected with the data signal line 15, a drain electrode 109 of the transistor 112 is connected with the capacitor electrode 266 via an extracting electrode 127p, the capacitor electrode 266 is connected with the pixel electrode 17a via a drain extracting electrode 127q and a contact hole. The drain electrode 209 of the transistor 212 is connected with the pixel electrode 17b via a contact hole. Here, a retention capacitor between the pixel electrode 17a and the retention capacitor line 18 is formed at a portion where the capacitor electrode 266 and the retention capacitor line 18 overlap each other, a retention capacitor between the pixel electrode 17b and the retention capacitor line 18 is formed at the overlapping portion 288, and a retention capacitor between the pixel electrode 17a and the pixel electrode 17b is formed at a portion where the capacitor electrode 267 overlaps the pixel electrode 17b.

Assume that the liquid crystal panel shown in FIG. 28 is driven. When the scanning signal line 16 is scanned, the same data signal potential is written in the pixel electrodes 17a and 17b. When (next) scanning signal line 116 is scanned, the pixel electrodes 17a and 17b are connected with each other via a capacitor. Consequently, the pixel electrode 17a serves as a dark sub-pixel and the pixel electrode 17b serves as a bright sub-pixel.

In the present liquid crystal panel, there is provided the overlapping portion 288 where the retention capacitor line 18 and the pixel electrode 17b overlap each other only via the gate insulating film and the inorganic insulating film. Accordingly, it is possible to enlarge a distance between the capacitor electrode 267 and the data signal line 115 while securing the retention capacitance between the pixel electrode 17b and the retention capacitor line 18. This allows subduing a short-circuit between the capacitor electrode 267 and the data signal line 115, thereby improving a production yield of the liquid crystal panel.

(Liquid Crystal Display Unit and Liquid Crystal Display Device of the Present Invention)

Figure 22:
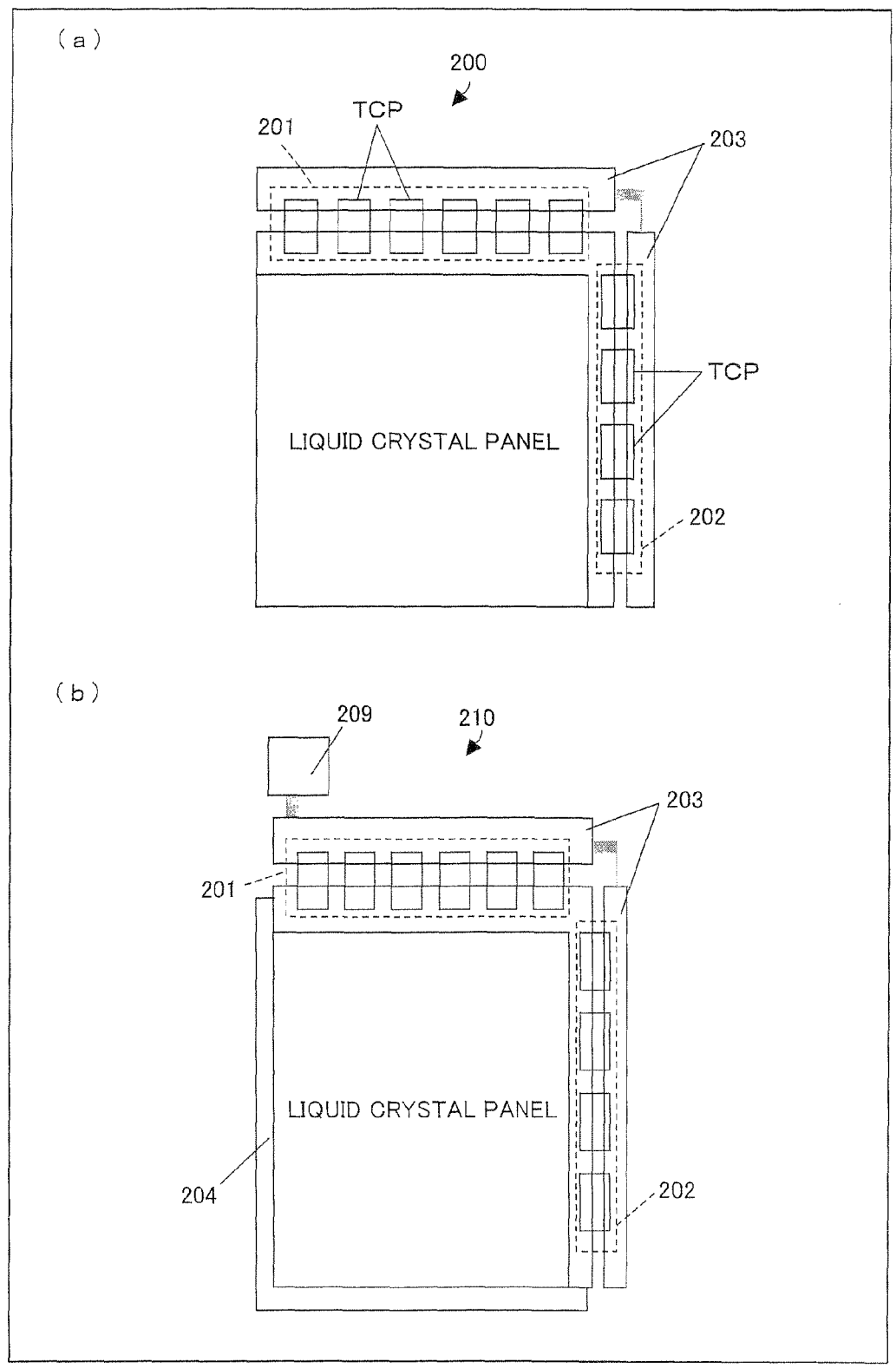
FIG. 22(a) schematically shows a configuration of a liquid crystal display unit of the present invention. (b) of FIG. 22 schematically shows a configuration of a liquid crystal display device of the present invention.

In the present embodiment, the liquid crystal display unit and the liquid crystal display device of the present invention are configured as follows. That is, to either side of the liquid crystal panel of the present invention, two polarization plates A and B are combined so that polarization axes of the polarization plates A and B intersect at right angles to each other. Furthermore, an optical compensation sheet or the like may be laminated on the polarization plate if necessary. Next, as shown in (a) of FIG. 22, drivers (a gate driver 202 and a source driver 201) are connected. The following description explains a connection by a TCP (Tape Career Package) method as one example. First, an ACF (Anisotoropic Conductive Film) is temporarily pressed on a terminal section of the liquid crystal panel. Next, a TCP in which the drivers are loaded is punched out from a carrier tape. The TCP is aligned to a panel terminal electrode, and is heated and finally pressed. Thereafter, a circuit substrate 203 (PWB: Printed wiring board) for connecting the drivers TCP together and an input terminal of the TCP are connected together with the ACF. With this, a liquid crystal display unit 200 is provided. Thereafter, as shown in (b) of FIG. 22, a display control circuit 209 is connected to the drivers (201 and 202) of the liquid crystal display unit via a circuit board 203. By integrating the liquid crystal display unit 200 and the display control circuit 209 with an illumination device (backlight unit) 204, a liquid crystal display device 210 is provided.

FIG. 23 is a block diagram showing a configuration of a liquid crystal display device of the present invention. As shown in the drawing, the liquid crystal display device of the present invention includes a display section (liquid crystal panel), a source driver (SD), a gate driver (GD), and a display control circuit. The source driver drives a gate signal line, a gate driver drives a scanning signal line, and a display control circuit controls the source driver and the gate driver.

The display control circuit receives, from an outside signal source (e.g. tuner), a digital video signal Dv indicative of an image to be displayed; a horizontal sync signal HSY and a vertical sync signal VSY each corresponding to the digital video signal Dv; and a control signal Dc for controlling display operation. Further, the control circuit generates, based on the signals Dv, HSY, VSY, and Dc thus received, a data start pulse signal SSP, a data clock signal SCK, a digital image signal DA indicative of an image to be displayed (signal corresponding to video signal Dv), a gate start pulse signal GSP, a gate clock signal GCK, and a gate driver output control signal (scanning signal output control signal) GOE, each serving as a signal for enabling a display section to display an image indicated by the digital video signal Dv, and the display control circuit outputs these signals.

To be more specific, the video signal Dv is subjected to timing adjustment etc. in an internal memory if necessary and then outputted as the digital image signal DA from the display control circuit. The data clock signal SCK is generated as a signal consisting of pulses corresponding to pixels of an image indicated by the digital image signal DA. The data start pulse signal SSP is generated, based on the horizontal sync signal HSY, as a signal which has a high (H) level only during a predetermined period with respect to each horizontal scanning period. The gate start pulse signal GSP is generated, based on the vertical sync signal VSY, as a signal which has a H level only during a predetermined period with respect to each frame period (each vertical scanning period). The gate clock signal GCK is generated based on the horizontal sync signal HSY. The gate driver output control signal GOE is generated based on the horizontal sync signal HSY and the control signal Dc.

Among the signals thus generated by the display control circuit, the digital image signal DA, the polarity inversion signal POL for controlling a signal potential (data signal potential), the data start pulse signal SSP, and the data clock signal SCK are input to the source driver, and the gate start pulse signal GSP, the gate clock signal GCK, and the gate driver output control signal GOE are input to the gate driver.

Based on the digital image signal DA, the data clock signal SCK, the data start pulse signal SSP, and the polarity inversion signal POL, the source driver sequentially generates analog voltages (signal voltages) corresponding to pixel values in each scanning signal line of an image represented by the digital image signal DA, and outputs these data signals to data signal lines, respectively.

Based on the gate start pulse signal GSP, the gate clock signal GCK, and the gate driver output control signal GOE, the gate driver generates gate-on pulses and outputs the gate-on pulses to the scanning signal lines, respectively, so as to selectively drive the scanning signal lines.

As described above, the source driver and the gate driver drive the data signal lines and the scanning signal lines of the display section (liquid crystal panel), so that a signal potential is written into a pixel electrode from a data signal line via a transistor (TFT) connected with the selected scanning signal line. Thus, in individual sub-pixels, a voltage is applied to the liquid crystal layer, and application of the voltage controls transmittance of light from the backlight, enabling the sub-pixels to display an image indicated by the digital video signal Dv.

Figure 24:
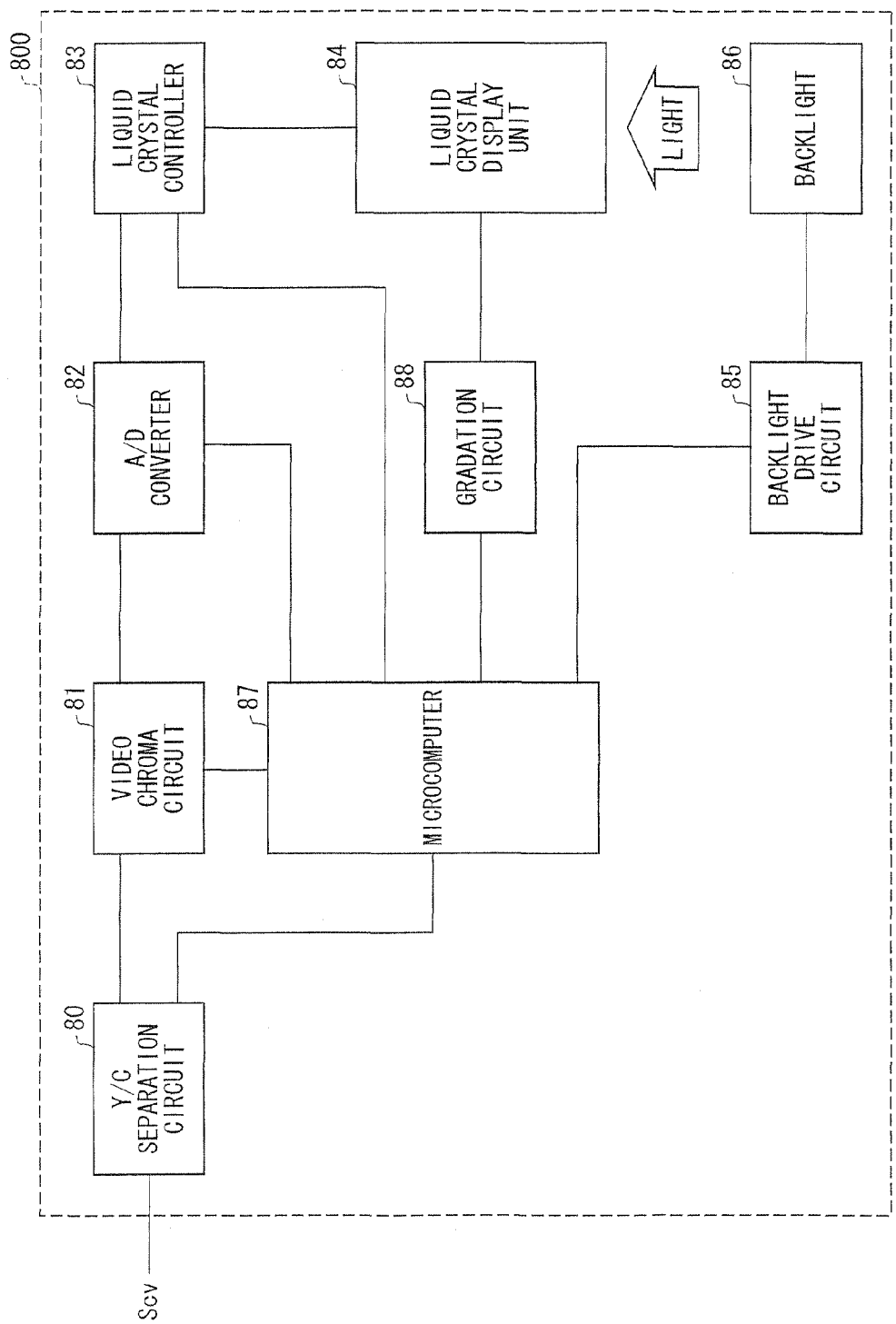
FIG. 24 is a block diagram explaining functions of the liquid crystal display device of the present invention.

Next, the following explains one example of configuration of applying the liquid crystal display device according to the present invention to a television receiver. FIG. 24 is a block diagram showing a configuration of a display device 800 for a television receiver. The display device 800 includes a liquid crystal display unit 84, a Y/C separation circuit 80, a video chroma circuit 81, an A/D converter 82, a liquid crystal controller 83, a backlight drive circuit 85, a backlight 86, a microcomputer 87, and a gradation circuit 88. The liquid crystal display unit 84 includes: a liquid crystal panel; and a source driver and a gate driver each for driving the liquid crystal panel.

In the display device 800 of the aforementioned configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted to analog RGB signals corresponding to three primary colors of light in the video chroma circuit 81. Further, the analog RGB signals are converted to digital RGB signals by the A/D converter 82. The digital RGB signals are inputted to the liquid crystal controller 83. Moreover, in the Y/C separation circuit 80, horizontal and vertical sync signals are extracted from the complex color video signal Scv inputted from the outside. These sync signals are also inputted to the liquid crystal controller 83 via the microcomputer 87.

The liquid crystal display unit 84 receives, from the liquid crystal controller 83, the digital RGB signals as well as timing signals based on the sync signals with predetermined timing. Further, the gradation circuit 88 generates gradation potentials corresponding to three primary colors R, G, and B for color display, and supplies the gradation potentials to the liquid crystal display unit 84. In the liquid crystal display unit 84, drive signals (data signals=signal potentials, scanning signals etc.) are generated by source driver, gate driver etc. in the liquid crystal display unit 84 in accordance with the RGB signals, the timing signals, and the gradation potentials, and a color image is displayed by a liquid crystal panel in the liquid crystal display unit 84. In order to enable the liquid crystal display unit 84 to display an image, it is necessary to emit light from the backside of the liquid crystal panel in the liquid crystal display unit. In the liquid crystal display 800, under control of the microcomputer 87, the backlight drive circuit 85 drives the backlight 86 so as to emit light to the backside of the liquid crystal panel. Control of the whole system, including the aforementioned processes is carried out by the microcomputer 87. As the video signal (complex color video signal) inputted from the outside, not only a video signal in accordance with television broadcast but also a video signal picked up by a camera or supplied via the Internet line is also usable. In the liquid crystal display 800, image display in accordance with various video signals can be performed.

Figure 25:
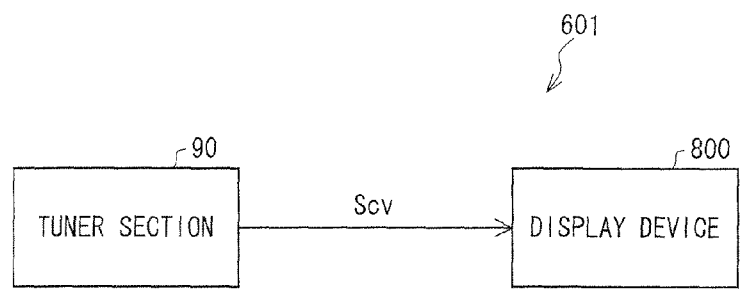
FIG. 25 is a block diagram explaining functions of a television receiver of the present invention.

In displaying an image by the liquid crystal display device 800 in accordance with television broadcast, a tuner section 90 is connected to the liquid crystal display device 800 as shown in FIG. 25 so that a television receiver 601 of the present invention is provided. The tuner section 90 extracts a channel signal to be received from waves (high-frequency signals) received by an antenna (not illustrated), and converts the channel signal to an intermediate frequency signal. The tuner section 90 detects the intermediate frequency signal, thereby extracting the complex color video signal Scv as the television signal. The complex color video signal Scv is inputted to the display device 800 as described above and an image is displayed by the display device 800 in accordance with the complex color video signal Scv.

Figure 26:
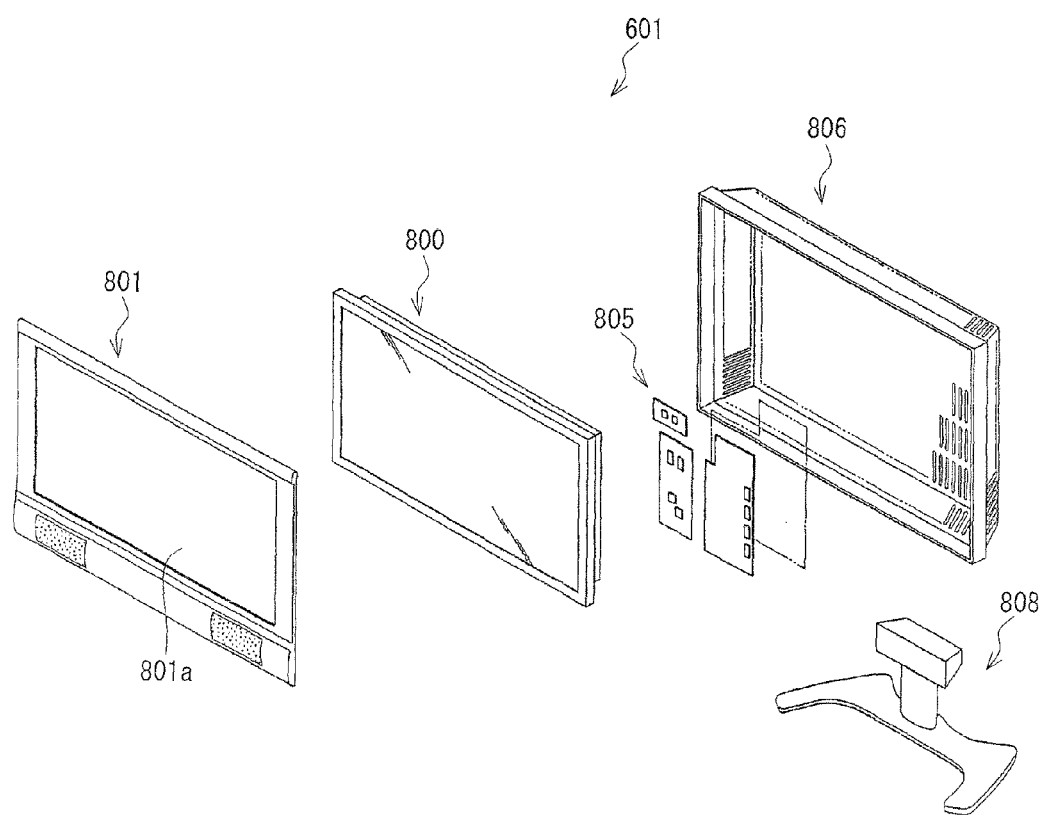
FIG. 26 is an exploded perspective drawing showing a configuration of the television receiver of the present invention.

FIG. 26 is an exploded perspective view showing one example of a configuration of the television receiver of the present invention. As shown in FIG. 26, the present television receiver 601 includes, as constituent features thereof, a first housing 801 and a second housing 806 in addition to the display device 800. The liquid crystal display device 800 is arranged such that the first and second housings 801 and 806 hold the display device 800 so as to wrap therein the display device 800. The first housing 801 has an opening 801a for transmitting an image displayed on the liquid crystal display device 800. On the other hand, the second housing 806 covers a back side of the liquid crystal display device 800. The second housing 806 is provided with an operating circuit 805 for operating the display device 800. The second housing 806 is further provided with a supporting member 808 therebelow.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The active matrix substrate of the present invention and the liquid crystal panel including the active matrix substrate are preferably applicable to a liquid crystal television for example.

REFERENCE SIGNS LIST

101-104: pixel
12: transistor
15: data signal line
16: scanning signal line
17a-17c: first-third pixel electrodes
18: retention capacitor line
21: organic gate insulating film
22: inorganic gate insulating film
25: inorganic interlayer insulating film
26: organic interlayer insulating film
51a, 51b: thin region
67: coupling capacitance electrode
84: liquid crystal display unit
601: television receiver
800: liquid crystal display device

The invention claimed is:

1. An active matrix substrate, comprising:
    a data signal line, a scanning signal line, a transistor connected with the data signal line and the scanning signal line, and a retention capacitor line,
    the active matrix substrate further comprising a first pixel electrode and a second pixel electrode in each pixel region,
    the first pixel electrode being connected with the data signal line via a drain electrode of the transistor,
    the second pixel electrode being capacitance-coupled to the first pixel electrode via a capacitor formed between the second pixel electrode and a coupling capacitance electrode electrically connected with the first pixel electrode, and the second pixel electrode overlapping the retention capacitor line via an insulating layer,
    the insulating layer having a thin region positioned to be at least a part of a portion which does not overlap the coupling capacitance electrode,
    wherein the insulating film is at least one of an interlayer insulating film covering a channel of the transistor and a gate insulating film,
    wherein the insulating film is the interlayer insulating film, the interlayer insulating film includes an inorganic insulating film and an organic insulating film, and
    the thin region on the insulating film has been made by thinning the organic insulating film or removing the organic insulating film.

2. The active matrix substrate as set forth in claim 1, wherein the organic insulating film includes at least one of acrylic resin, epoxy resin, polyimide resin, polyurethane resin, novolak resin, and siloxane resin.

3. The active matrix substrate as set forth in claim 1, wherein the first pixel electrode and the scanning signal line partially overlap each other.

* * * * *